(12) United States Patent
Yasui et al.

(10) Patent No.: US 7,588,497 B2
(45) Date of Patent: Sep. 15, 2009

(54) METHOD, AN APPARATUS AND A COMPUTER PROGRAM PRODUCT FOR GENERATING AN IMAGE

(75) Inventors: Kentarou Yasui, Tokyo (JP); Yosuke Shiokawa, Tokyo (JP); Ryuji Ikeda, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 528 days.

(21) Appl. No.: 11/432,512

(22) Filed: May 12, 2006

(65) Prior Publication Data
US 2006/0258449 A1 Nov. 16, 2006

(30) Foreign Application Priority Data
May 13, 2005 (JP) .............................. 2005-140722

(51) Int. Cl.
*A63F 13/00* (2006.01)
(52) U.S. Cl. ............................... 463/33; 463/31; 463/32
(58) Field of Classification Search ................... 463/31, 463/32, 33
See application file for complete search history.

(56) References Cited

U.S. PATENT DOCUMENTS
5,287,446 A * 2/1994 Williams et al. ............ 345/474

FOREIGN PATENT DOCUMENTS
JP 11-203504 7/1999
JP 2003-141560 5/2003

OTHER PUBLICATIONS

English language Abstract of JP 2003-141560.
English language Abstract of JP 11-203504.
U.S. Appl. No. 11/460,747 to Kanemori et al., which filed on Jul. 28, 2006.

* cited by examiner

*Primary Examiner*—John M Hotaling, II
*Assistant Examiner*—Joshua P. Wert
(74) *Attorney, Agent, or Firm*—Greenblum & Bernstein, P.L.C.

(57) ABSTRACT

When a player character is moved toward a two-dimensional non-player character (NPC) in response to operation of an input section 21 by a player, a main process is repeatedly carried out by a video game apparatus 100. Thus, the two-dimensional NPC approaches the player character and is moved toward a visual boundary surface, and finally leaves the field of view of the virtual camera without moving within the 2D inhibit space. Because the two-dimensional NPC is maintained in a space opposite from the player character with respect to a boundary surface between 2D and 3D in this way, and the two-dimensional NPC is prevented from moving within the side of the player character P from the boundary surface between 2D and 3D, it is possible to reduce processing load of hardware without losing realism (realistic sensation) when an image including multiple objects is drawn in a virtual three-dimensional space.

21 Claims, 11 Drawing Sheets (A) DRAWING OF VIRTUAL THREE-DIMENSIONAL SPACE WHEN VIEWED FROM UPPER SIDE (B) DRAWING OF VIRTUAL THREE-DIMENSIONAL SPACE WHEN VIEWED FROM LEFT SIDE

METHOD, AN APPARATUS AND A COMPUTER PROGRAM PRODUCT FOR GENERATING AN IMAGE

CROSS-REFERENCE TO RELATED APPLICATION

The present disclosure relates to subject matter contained in Japanese Patent Application No. 2005-140722, filed on May 13, 2005, the disclosure of which is expressly incorporated herein by reference in its entirety.

FIELD OF THE INVENTION

The present invention relates to a technique to generate a character image in which a plurality of characters including a three-dimensional character drawn by three-dimensional polygon data and a two-dimensional character drawn by two-dimensional sprite data are drawn in a virtual three-dimensional space.

BACKGROUND OF THE INVENTION

When characters including three-dimensional objects are drawn in a virtual three-dimensional space in a personal computer, a video game machine or the like, the three-dimensional objects are generally drawn by three-dimensional polygon data. The three-dimensional polygon data are respectively generated by carrying out polygon calculations in accordance with a distance between each of the three-dimensional objects in the field of view of a virtual camera and the viewpoint position of the virtual camera or the like.

For this reason, as the number of three-dimensional objects drawn in the virtual three-dimensional space becomes larger, the amount of polygon calculations increases. Thus, there is a fear that throughput exceeds computing power of hardware such as a personal computer and a video game machine in the case where a large number of three-dimensional objects are drawn in the virtual three-dimensional space. In the case where such throughput exceeds computing power, negative effects such as reduced display speed and screen flicker may occur.

In order to solve such a problem, in some conventional personal computers or video game machines, drawing of three-dimensional objects which are further apart from the viewpoint position of the virtual camera by a predetermined distance or more is omitted, whereby the number of three-dimensional objects to be drawn is reduced. However, although objects are far from the viewpoint position of the virtual camera, they can still be seen in a real space. Since such objects are omitted in the screen displayed as the virtual three-dimensional space, the screen becomes less realistic (realistic sensation is reduced).

In this regard, in order to reduce the processing load of hardware without omitting objects to be displayed on the virtual three-dimensional space, there is a known process in which all objects are not drawn by three-dimensional polygon data when a lot of objects are to be displayed on the virtual three-dimensional space. Some of the objects which are further from the viewpoint position of the virtual camera by a predetermined distance or more are drawn by two-dimensional sprite data (for example, see Japanese Patent Application Publication No. 2003-141560).

However, in the technique of the patent document mentioned above, it is determined whether or not objects to be displayed exist within a predetermined distance or more from the viewpoint position of the virtual camera. In the case where the objects exist within the predetermined distance, they are drawn by three-dimensional polygon data. On the other hand, in the case where the objects exist outside the predetermined distance, they are drawn by two-dimensional sprite data. For this reason, in the case where an object has to move forward or backward across the predetermined distance from the viewpoint position of the virtual camera, it becomes necessary to change such an object between a two-dimensional object and a three-dimensional object. Therefore, a process to change between two-dimensional sprite data and three-dimensional polygon data is required. Further, in the case where an object drawn by two-dimensional sprite data (that is, a two-dimensional object) is changed into an object drawn by three-dimensional polygon data (that is, a three-dimensional object), three-dimensional objects to be drawn in the virtual three-dimensional space are increased. For this reason, there is a fear that throughput exceeds computing power of hardware such as a personal computer and a video game machine because control load (processing load) of the hardware maybe increased.

SUMMARY OF THE INVENTION

It is one object of the present invention to provide a method, an apparatus and a computer program product for generating an image by which it is possible to solve the problems as described above and to reduce processing load of hardware without losing realism (realistic sensation) when an image including multiple objects is drawn in a virtual three-dimensional space.

In order to achieve the above object, in one aspect of the present invention, the present invention is directed to a method of generating a character image in which multiple characters are drawn in a virtual three-dimensional space. In this case, the plurality of characters include a three-dimensional character (for example, a three-dimensional non-player character) drawn by three-dimensional polygon data and a two-dimensional character (for example, a two-dimensional non-player character) drawn by two-dimensional sprite data. The method includes the step of drawing the three-dimensional character in the field of view of a virtual camera and within a predetermined distance (for example, 50 m in a real space) from a viewpoint position of the virtual camera, and drawing the two-dimensional character in the field of view of the virtual camera and outside the predetermined distance from the viewpoint position of view of the virtual camera (for example, a process at Step S108 for drawing an initial screen determined at Step S102).

The method also includes the step of drawing the three-dimensional character so as to move to a position (for example, a position within a space of the side of the viewpoint position of the virtual camera from a boundary surface between 2D and 3D, or a position further outside a 3D display inhibit space) which is still within the predetermined distance from the viewpoint position of the virtual camera when the position of the three-dimensional character drawn in the field of view of the virtual camera is to be moved even in the case where the viewpoint position of the virtual camera is moved (for example, a process at Step S108 for drawing a three-dimensional non-player character at a position determined at Step S303 or S304).

The method also includes the step of drawing the two-dimensional character so as to move to a position (for example, a position within a space of the opposite side of the viewpoint position of the virtual camera from the boundary surface between 2D and 3D, or a position further outside a 2D display inhibit space) which is still outside the predetermined distance from the viewpoint position of the virtual camera when the position of the two-dimensional character drawn in the field of view of the virtual camera is to be moved even in the case where the viewpoint position of the virtual camera is moved (for example, a process at Step S108 for drawing a two-dimensional non-player character at a position determined at Step S203 or S204).

Since the method of the present invention can have the steps as described above, it is possible to maintain a position of a three-dimensional character to be drawn within a predetermined distance from the viewpoint position of a virtual camera, and it is possible to maintain a position of a two-dimensional character to be drawn outside the predetermined distance from the viewpoint position of the virtual camera. This makes it possible to prevent the three-dimensional character and the two-dimensional character from passing through the boundary surface formed at the predetermined distance from the viewpoint position of the virtual camera. Therefore, it is possible to reduce processing load of hardware without losing realism (realistic sensation) when an image including multiple characters (two-dimensional characters and three-dimensional characters) is drawn in the virtual three-dimensional space.

It is preferable that in the virtual three-dimensional space, a two-dimensional character display inhibit space (for example, a 2D inhibit space) for inhibiting the two-dimensional character from being displayed is provided in a part of the outside of the predetermined distance from the viewpoint position of the virtual camera in advance. The two-dimensional character drawing step can include the step of determining whether the two-dimensional character moves within the two-dimensional character display inhibit space or not when the position of the two-dimensional character is to be moved (for example, Step S202). It can also include the step of changing the position of the two-dimensional character to be moved to a position outside the two-dimensional character display inhibit space in accordance with predefined conditions for movement of the two-dimensional character (for example, 2D position selecting conditions) in the case where it is determined that the two-dimensional character would move within the two-dimensional character display inhibit space as a result of the movement of the two-dimensional character (for example, Step S203). By constituting the method of the present invention in this way, it is possible to maintain the position of a two-dimensional character to be drawn outside the two-dimensional character display inhibit space.

In an aspect of the present invention, the field of view of the virtual camera is defined by a visual boundary, and the two-dimensional character display inhibit space is, for example, a space adjacent to a boundary surface formed at the predetermined distance from the viewpoint position of the virtual camera. The two-dimensional character display inhibit space can be configured so that the two-dimensional character is allowed to be displayed at a position near the boundary surface when the two-dimensional character is to be displayed at a position near the visual boundary and the two-dimensional character is inhibited from being displayed at a position near the boundary surface when the two-dimensional character is to be displayed at a position away from the visual boundary. Further, the predefined conditions for movement of the two-dimensional character are satisfied, for example, when the two-dimensional character is at a position away from a central axis of the virtual three-dimensional space so as to approach the visual boundary and also outside the two-dimensional character display inhibit space. By defining them in this way, in the case where the viewpoint position of the virtual camera is moved in a direction to approach a second-dimensional character, the second-dimensional character is moved in a direction toward the visual boundary of the virtual camera while the position of the second-dimensional character to be drawn is still outside the predetermined distance from the viewpoint position of the virtual camera. Thus, it is possible to smoothly move the second-dimensional character to the outside of the field of view of the virtual camera while the two-dimensional character is prevented from moving within the predetermined distance from the viewpoint position of the virtual camera.

It is preferable that the two-dimensional character drawing step includes the steps of: determining whether the two-dimensional character moves within a predetermined distance from the virtual camera or not when the position of the two-dimensional character is to be moved; and changing the position of the two-dimensional character to be moved to the outside of the predetermined distance from the virtual camera in the case where it is determined that the two-dimensional character would move within the predetermined distance from the virtual camera as a result of the movement of the two-dimensional character. By constituting the method of the present invention, even in the case where the viewpoint position of the virtual camera is moved in a direction to approach the second-dimensional character, it is possible to maintain the position of the second-dimensional character to be drawn outside the predetermined distance from the viewpoint position of the virtual camera.

It is preferable that in the virtual three-dimensional space, a three-dimensional character display inhibit space (for example, a 3D inhibit space) for inhibiting the three-dimensional character from being displayed is provided in a part of the inside of the predetermined distance from the viewpoint position of the virtual camera in advance. Further, it is also preferable that the three-dimensional character drawing step includes the steps of: determining whether the three-dimensional character moves within the three-dimensional character display inhibit space or not when the position of the three-dimensional character is to be moved (for example, Step S302); and changing the position of the three-dimensional character to be moved to a position outside the three-dimensional character display inhibit space in accordance with predefined conditions for movement of the three-dimensional character (for example, 3D position selecting conditions) in the case where it is determined that the three-dimensional character would move within the three-dimensional character display inhibit space as a result of the movement of the three-dimensional character (for example, Step S303). By constituting the method of the present invention in this way, it is possible to maintain the position of a three-dimensional character to be drawn outside the three-dimensional character display inhibit space.

In the present invention, the field of view of the virtual camera can be defined by a visual boundary, and the three-dimensional character display inhibit space can be, for example, a space adjacent to a boundary surface formed at the predetermined distance from the viewpoint position of the virtual camera. The three-dimensional character display inhibit space can be configured so that the three-dimensional character is allowed to be displayed at a position near the boundary surface when the three-dimensional character is to be displayed at a position near the visual boundary and the three-dimensional character is inhibited from being displayed at a position near the boundary surface when the three-dimensional character is to be displayed at a position away from the visual boundary. Further, the predefined conditions for movement of the three-dimensional character are satisfied, for example, when the three-dimensional character is at a position away from a central axis of the virtual three-dimensional space so as to approach the visual boundary also outside the three-dimensional character display inhibit space. By defining them in this way, in the case where the viewpoint position of the virtual camera is moved in a direction to back away from a three-dimensional character, the three-dimensional character is moved in a direction toward the visual boundary of the virtual camera while the position of the three-dimensional character to be drawn is still within the predetermined distance from the viewpoint position of the virtual camera. Thus, it is possible to smoothly move the three-dimensional character to the outside of the field of view of the virtual camera while the three-dimensional character is prevented from moving outside the predetermined distance from the viewpoint position of the virtual camera.

It is preferable that the three-dimensional character drawing step includes the steps of: determining whether the three-dimensional character moves outside a predetermined distance from the virtual camera or not when the position of the three-dimensional character is to be moved; and changing the position of the three-dimensional character to be moved to the outside of the predetermined distance from the virtual camera in the case where it is determined that the three-dimensional character would move within the predetermined distance from the virtual camera as a result of the movement of the three-dimensional character. By constituting the method of the present invention in this way, even in the case where the viewpoint position of the virtual camera is moved in a direction to back away from the three-dimensional character, it is possible to maintain the position of the three-dimensional character to be drawn within the predetermined distance from the viewpoint position of the virtual camera.

It is preferable that the character drawing step includes the step of: when the total number of three-dimensional characters drawn in the virtual three-dimensional space becomes a predetermined number (for example, the 3D upper limit number) or less, drawing a new three-dimensional character in the virtual three-dimensional space (for example, Steps S306 to S308). By constituting the method of the present invention in this way, it is possible to set the total number of three-dimensional characters so that it does not exceed the predetermined number, and therefore, it is possible to prevent the processing load of hardware from exceeding processing capacity of the hardware.

Further, in another aspect of the present invention, the present invention is directed to an image generating apparatus (for example, a video game apparatus 100 and a video game apparatus main body 10) for generating a character image in which multiple characters are drawn in a virtual three-dimensional space. In this case, the plurality of characters include a three-dimensional character drawn by three-dimensional polygon data and a two-dimensional character drawn by two-dimensional sprite data. The image generating apparatus includes a character drawing system which draws the three-dimensional character in the field of view of a virtual camera and within a predetermined distance from a viewpoint position of the virtual camera, and draws the two-dimensional character in the field of view of the virtual camera and outside the predetermined distance from the viewpoint position of the virtual camera (for example, a portion which carries out the process at Step S108 for drawing an initial screen determined by a control section 11 and a graphics processor 15 at Step S102).

The apparatus also includes a three-dimensional character moving drawing system which draws the three-dimensional character so as to move to a position which is still within the predetermined distance from the viewpoint position of the virtual camera when the position of the three-dimensional character drawn in the field of view of the virtual camera is to be moved even in the case where the viewpoint position of the virtual camera is moved (for example, a portion which carries out the process at Step S108 for drawing a three-dimensional non-player character at the position determined by the control section 11 and the graphics processor 15 at Step S303 or S304).

The apparatus also includes a two-dimensional character moving drawing system which draws the two-dimensional character so as to move to a position which is still outside the predetermined distance from the viewpoint position of the virtual camera when the position of the two-dimensional character drawn in the field of view of the virtual camera is to be moved even in the case where the viewpoint position of the virtual camera is moved (for example, a portion which carries out the process at Step S108 for drawing a two-dimensional non-player character at the position determined by the control section 11 and the graphics processor 15 at Step S203 or S204).

Since the image generating apparatus of the present invention can have the configuration as described above, it is possible to maintain a position of a three-dimensional character to be drawn within a predetermined distance from the viewpoint position of a virtual camera, and it is possible to maintain a position of a two-dimensional character to be drawn outside the predetermined distance from the viewpoint position of the virtual camera. This makes it possible to prevent the three-dimensional character and the two-dimensional character from passing through the boundary surface formed at the predetermined distance from the viewpoint position of the virtual camera. Therefore, it is possible to reduce processing load of hardware without losing realism (realistic sensation) when an image including multiple characters (two-dimensional characters and three-dimensional characters) is drawn in the virtual three-dimensional space.

Moreover, in still another aspect of the present invention, the present invention is directed to a computer program product (for example, processing programs stored in a storage medium 70) for generating a character image in which multiple characters are drawn in a virtual three-dimensional space. In this case, the plurality of characters include a three-dimensional character drawn by three-dimensional polygon data and a two-dimensional character drawn by two-dimensional sprite data. The computer program product causes a computer (for example, the video game apparatus 100 and the video game apparatus main body 10) to execute steps of: including drawing the three-dimensional character in the field of view of a virtual camera and within a predetermined distance from a viewpoint position of the virtual camera, and drawing the two-dimensional character in the field of view of the virtual camera and outside the predetermined distance from the viewpoint position of the virtual camera (for example, the process at Step S108 for drawing the initial screen determined at Step S102).

The steps also include drawing the three-dimensional character so as to move to a position which is still within the predetermined distance from the viewpoint position of the virtual camera when the position of the three-dimensional character drawn in the field of view of the virtual camera is to be moved even in the case where the viewpoint position of the virtual camera is moved (for example, the process at Step S108 for drawing the three-dimensional non-player character at the position determined at Step S303 or S304).

The steps also include drawing the two-dimensional character so as to move to a position which is still outside the predetermined distance from the viewpoint position of the virtual camera when the position of the two-dimensional character drawn in the field of view of the virtual camera is to be moved even in the case where the viewpoint position of the virtual camera is moved (for example, the process at Step S108 for drawing the two-dimensional non-player character at the position determined at Step S203 or S204).

Since the computer program product of the present invention can have the configuration as described above, it is possible to make the computer to be controlled so as to maintain a position of a three-dimensional character to be drawn within a predetermined distance from the viewpoint position of a virtual camera. It is also possible to make the computer to be controlled so as to maintain a position of a two-dimensional character to be drawn outside the predetermined distance from the viewpoint position of the virtual camera. This makes it possible to prevent the three-dimensional character and the two-dimensional character from passing through the boundary surface formed at the predetermined distance from the viewpoint position of the virtual camera. Therefore, it is possible to reduce processing load of hardware without losing realism (realistic sensation) when an image including multiple characters (two-dimensional characters and three-dimensional characters) is drawn in the virtual three-dimensional space.

According to an aspect of the present invention, it is possible to maintain a position of a three-dimensional character to be drawn within a predetermined distance from the viewpoint position of a virtual camera, and it is possible to maintain a position of a two-dimensional character to be drawn outside the predetermined distance from the viewpoint position of the virtual camera. This makes it possible to prevent the three-dimensional character and the two-dimensional character from passing through the boundary surface formed at the predetermined distance from the viewpoint position of the virtual camera. Therefore, it is possible to reduce the processing load of hardware without losing realism (realistic sensation) when an image including multiple characters (two-dimensional characters and three-dimensional characters) is drawn in the virtual three-dimensional space.

BRIEF DESCRIPTION OF THE DRAWINGS

The foregoing and other objects, features and advantages of the present invention will become more readily apparent from the following detailed description of preferred embodiments of the present invention which proceeds with reference to the appending drawings.

DETAILED DESCRIPTION OF THE INVENTION

Preferred embodiments of a method, an apparatus and a computer program product for generating an image according to the present invention will now be described in detail with reference to the appending drawings.

Figure 1:
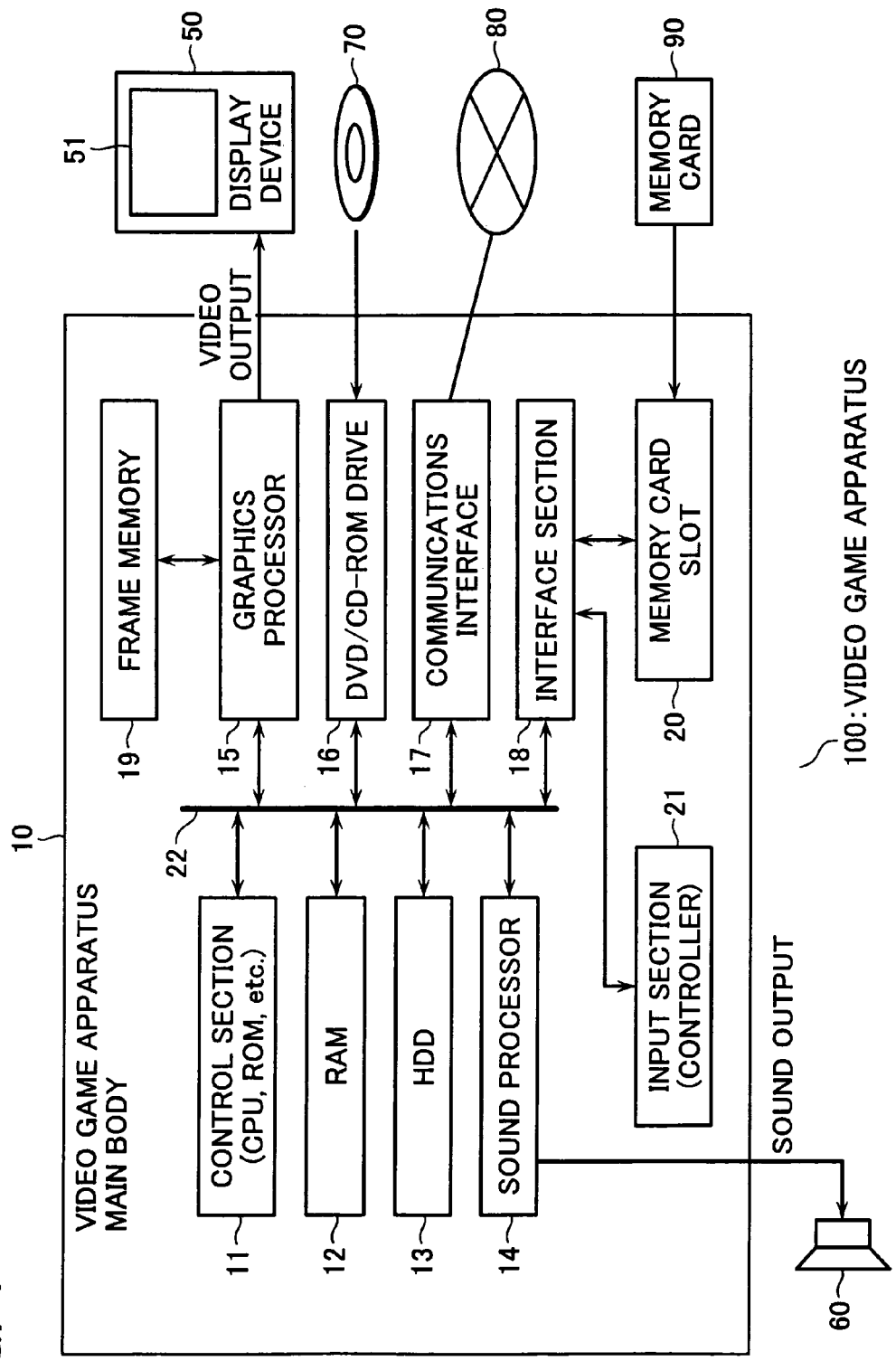
FIG. 1 is a block diagram which illustrates a configuration of a video game apparatus to which an embodiment of the present invention is applied.

FIG. 1 is a block diagram which illustrates a configuration of a video game apparatus 100 to which an embodiment of the present invention is applied.

As shown in FIG. 1, a video game apparatus 100 of this embodiment includes a video game apparatus main body 10, a display device 50, and a sound output device 60. The video game apparatus main body 10 is constituted from a video game system which is put on the market, for example. Further, the display device 50 is constituted from, for example, a television apparatus, a liquid crystal display device or the like, and is provided with an image display screen 51.

The video game apparatus main body 10 includes a control section 11, a RAM (Random Access Memory) 12, a HDD (hard disk drive) 13, a sound processor 14, a graphics processor 15, a DVD/CD-ROM drive 16, a communications interface 17, an interface section 18, a frame memory 19, a memory card slot 20, and an input section (controller) 21.

Each of the control section 11, the RAM (Random Access Memory) 12, the HDD (Hard Disc Drive) 13, the sound processor 14, the graphics processor 15, the DVD/CD-ROM drive 16, the communications interface 17 and the interface section 18 is connected to an internal bus 22.

The control section 11 includes a CPU (Central Control Unit), ROM (Read Only Memory) and the like, and carries out control of the whole video game apparatus 100 in accordance with control programs stored in the HDD 13 and/or a storage medium 70. The control section 11 has an internal timer used to generate timer interruption. The RAM 12 is used as a work area for the control section 11. The HDD 13 is a storage region for storing the control programs and various data.

The sound processor 14 is connected to the sound output device 60 constituted from a speaker, for example. The sound processor 14 outputs a sound signal to the sound output device 60 in accordance with a sound outputting command from the control section 11 which carries out a process according to the control programs. In this regard, the sound output device 60 may be embedded in the display device 50 or the video game apparatus main body 10.

The graphics processor 15 is connected to the display device 50 having the image display screen 51 on which an image is displayed. The graphics processor 15 develops an image on the frame memory 19 in accordance with a drawing command from the control section 11, and outputs video signals for displaying the image on the image display screen 51 to the display device 50. A switching time for images to be displayed according to the video signals is set to 1/30 seconds per frame, for example.

A storage medium 70 such as a DVD-ROM medium and a CD-ROM medium in which control programs for a game are stored is mounted in the DVD/CD-ROM drive 16. The DVD/CD-ROM drive 16 carries out a process for reading out various data such as control programs from the storage medium 70.

The communications interface 17 is connected to a communication network 80 such as the internet in a wireless or wired manner. The video game apparatus main body 10 carries out communication with, for example, another computer via the communication network 80 using a communication function of the communications interface 17.

Each of the input section 21 and the memory card slot 20 is connected to the interface section 18. The interface section 18 makes the RAM 12 to store instruction data from the input section 21 on the basis of operation of the input section 21 by a player of the video game apparatus 100. In response to the instruction data stored in the RAM 12, the control section 11 carries out various arithmetic processing.

The input section 21 is constituted from, for example, a controller for a video game apparatus 100, and has multiple operational buttons (operational keys) such as a directional instruction key. In the present embodiment, when a player (a user of the video game apparatus 100) operates the directional instruction key, a player character (will be described later) is moved virtually. Further, operation of any other operational buttons by the player makes the control section 11 to carry out a predetermined process according to the scene displayed on the image display screen 51. In this regard, the directional instruction key is used to move a cursor and the like.

Further, the interface section 18 carries out, according to the command from the control section 11, a process to store data indicative of the progress of the game stored in the RAM 12 into the memory card 90 installed in the memory card slot 20, a process to read out data on the game stored in the memory card 90 at the time of suspending the game and to transfer such data to the RAM 12, and the like.

Various data such as control program data for performing the game with the video game apparatus 100 are stored in, for example, the storage medium 70. The various data such as the control program data stored in the storage medium 70 are read out by the DVD/CD-ROM drive 16 in which the storage medium 70 is installed, and the data thus read out are loaded onto the RAM 12. The control section 11 carries out, in accordance with the control program loaded on the RAM 12, various processes such as a process to output the drawing command to the graphics processor 15, and a process to output the sound outputting command to the sound processor 14. In this regard, the interim data generated in response to the progress of the game (for example, data indicative of scoring of the game, the state of a player character and the like) are stored in the RAM 12 used for a work memory while the control section 11 carries out processing.

It is assumed that the three-dimensional video game according to the present embodiment is a game in a part of which multiple characters including a player character (that is, a character that moves in accordance with the operation of the input section 21 by the player, will be described later) move on a field provided in a virtual three-dimensional space, by which the game proceeds. In this regard, it is assumed that the virtual three-dimensional space in which the field is formed is indicated by coordinates of the world coordinate system. The field is defined by multiple surfaces, and coordinates of vertexes of the respective constituent surfaces are shown as characteristic points.

Figure 2:
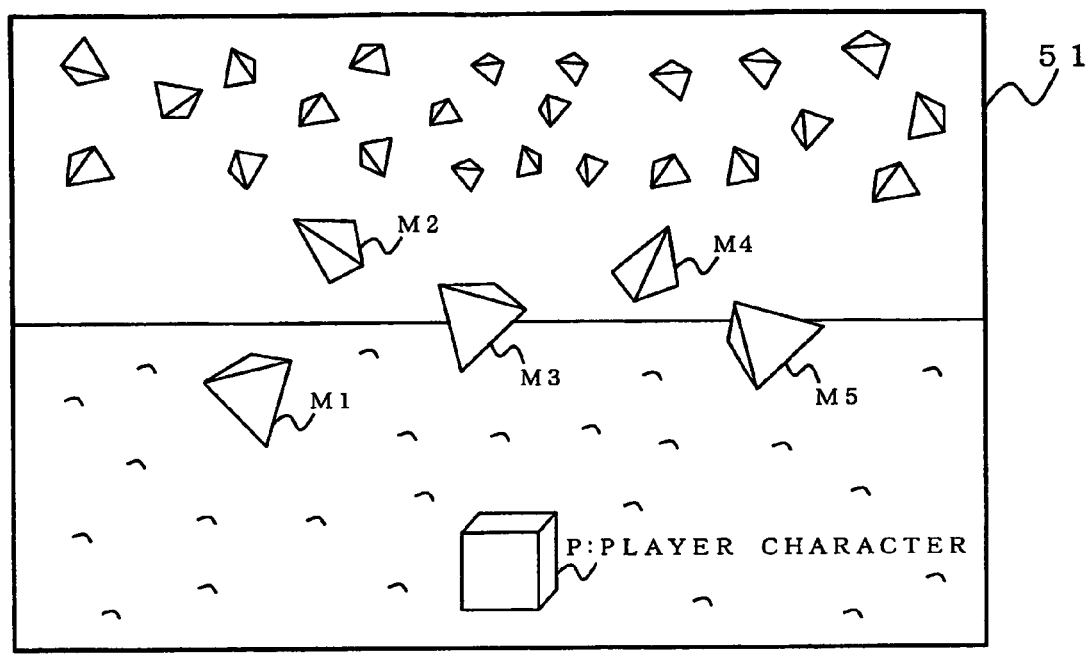
FIG. 2 is an explanatory drawing which shows an example of a character image displayed in an image display section.

FIG. 2 is an explanatory drawing which shows an example of a character image displayed in the image display section 51 on the three-dimensional video game according to the present embodiment. A player character P and multiple non-player characters (which are not moved in response to operation of the player, but are moved in accordance with control of the video game apparatus 100 (more specifically, control of the control section 11), and hereinafter, referred to simply as "NPC") are displayed in the character image illustrated in FIG. 2. In order to simplify the illustration in FIG. 2, the player character P is shown by a cube, while each of the NPCs is shown by a regular tetrahedron. The player character P and the respective NPCs are actually shown as characters which imitate a human and/or an animal, for example, and characters formed as objects such as a vehicle.

Each part forming the player character P is constituted from multiple polygons, and the characteristic points (vertexes of the respective polygons) are indicated by coordinates of the local coordinate system. Namely, the player character P is a three-dimensional character drawn by three-dimensional polygon data.

As illustrated in FIG. 2, the player character P is shown at a lower portion of the central position in the image display screen 51 in the present embodiment. In this case, the player character P may be movable within a predetermined range of the lower portion of the central position in the image display screen 51. In the present embodiment, the player character P is constituted not to be moved to an upper side from a predetermined position of the lower portion of the central position in the image display screen 51. The position of the respective vertexes of each polygon constituting the player character P is defined by identifying the positional relationship of each of the characteristic points by the local coordinate system and transferring the coordinates of the characteristic points to the coordinates of the world coordinate system.

Five NPCs M1 to M5 among the multiple NPCs illustrated in FIG. 2 are three-dimensional characters drawn by three-dimensional polygon data as well as the player character P. On the other hand, the NPCs other than the NPCs M1 to M5 are two-dimensional characters drawn by two-dimensional sprite data. In other words, the multiple NPCs displayed in the character image illustrated in FIG. 2 are constituted from three-dimensional characters (non-player characters M1 to M5) and two-dimensional characters (NPCs other than the non-player characters M1 to M5).

Each of the NPCs is moved in accordance with the progress of the game in response to the control program. Namely, even when the player character P is not moved, one or more NPC is moved on the character image in response to the control program.

Further, each of the NPCs may newly appear on the character image from the outside of an image display range of the image display screen 51, disappear from the character image, and be moved to the outside of the image display range. Moreover, each of the NPCs may have the same shape as each other. Alternatively, a part or all of the NPCs may have different shapes, respectively.

In the present embodiment, the viewpoint position of the virtual camera is controlled so as to follow the movement of the player character P at a predetermined space (range) from the player character P. In other words, the viewpoint position of the virtual camera is set at a viewpoint position, so-called "third person viewpoint", and is updated to follow the player character P. More specifically, the viewpoint position of the virtual camera is set at the back of the player character P with a predetermined space (range) from the player character P (for example, 10 m in the real space), and the viewpoint position is controlled to follow the player character P so as to maintain the space (range) between the player character P and the viewpoint position at the predetermined space (range) and to be updated at the back side or front side of the virtual three-dimensional space when the player character P is moved to the back side or front side of the virtual three-dimensional space. In order to maintain the predetermined space (range) described above, for example, control of the viewpoint position is carried out so that the virtual camera is moved on the surface of a sphere having the same diameter in which the player character P is positioned at the center thereof. It is to be noted that the control of the viewpoint position described above is one example. For example, multiple virtual cameras each of which can follow a range of the player character P motion with the "third person viewpoint" (movable range of the viewpoint position) is defined in advance may be utilized. One virtual camera to use for the image display on the image display screen 51 may be switched to another one of the multiple virtual cameras in response to the position to which the player character P is moved. Further, the present invention is not limited to the "third person viewpoint", and the control of the viewpoint position may be carried out by "first person viewpoint".

The image in which the player character P and/or the multiple NPCs are moved on the field in the virtual three-dimensional space is displayed on the image display screen 51 by perspective-transforming the virtual three-dimensional space by means of the virtual camera, whereby the player of the game recognizes such an image. The image projected on a virtual screen from the virtual camera positioned in the virtual three-dimensional space becomes the image displayed on the image display screen 51. A viewpoint coordinate system is used to project an image on the virtual screen. For this reason, the coordinates of the world coordinate system are to be transformed to the coordinates of the viewpoint coordinate system.

In the case where an image projected on the virtual screen is generated by means of the perspective transformation, there is a need to carry out hidden surface removal that removes a surface of the object hidden by another object placed in the front thereof. In the present embodiment, a Z buffer method is used as the hidden surface removal method. Namely, when the control section 11 transforms the coordinates of the world coordinate system to the coordinates of the viewpoint coordinate system, the control section 11 informs the graphics processor 15 of the coordinates of the respective characteristic points and outputs the drawing command thereto. On the basis of this drawing command, the graphics processor 15 updates the content of the Z buffer so that data on the points which reside at the front side are retained with respect to the respective characteristic points, and develop the image data on the characteristic points on the frame memory 19 for every update.

Next, operation of the video game apparatus 100 according to the present embodiment will now be described.

Here, in order to simplify the explanation, it is assumed that only a player character P and multiple NPCs exist as objects which are movable in the virtual three-dimensional space, and the explanation for any process other than the processes relating to the present invention are omitted, in particular.

Figure 3:
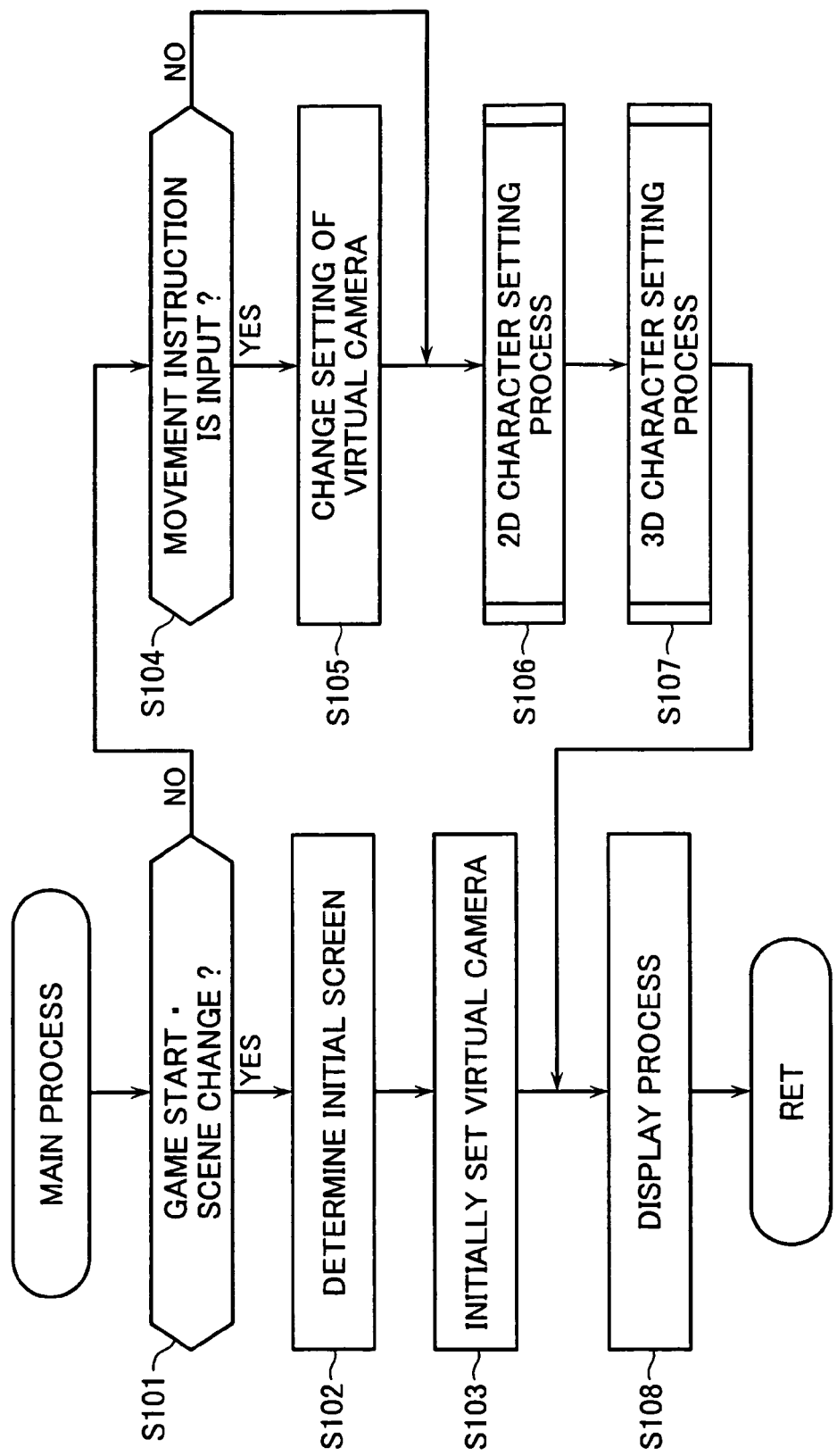
FIG. 3 is a flowchart which illustrates an example of a main process.

FIG. 3 is a flowchart which illustrates an example of a main process of the video game apparatus 100 according to the present embodiment. The main process is a process for generating an image for one frame, and is carried out in accordance with timer interruption at every $1/30$ second. It is to be noted that timing of "at every $1/30$ second" is one example. For example, the main process may be carried out in accordance with timer interruption at every single field period (every $1/60$ second) or at every two frame periods (every $1/15$ second).

In the main process, the control section 11 determines whether the instruction for start of the game is generated by the operation of the input section 21 by means of the player or not in the case where the state is still before the game start. Alternatively, the control section 11 determines whether the state becomes timing to change the scene or not in the case where the state is during execution of the game (Step S101). The timing to change the scene means, for example, timing in which a virtual three-dimensional space illustrating a new scene is displayed on the image display screen 51 in order to finish the scene that has been displayed on the image display screen 51 until now (for example, a scene displayed by a virtual three-dimensional space, and a scene displayed by a directorial moving image) and to switch the displayed scene to the new scene.

In the case where it is determined that the instruction for start of the game is generated or that the state becomes the timing to change the scene ("Yes" at Step S101), the control section 11 determines an initial screen (initial screen at the time of start of the game, or initial screen at the time of change in the scene) in accordance with the control program (Step S102). In this case, various data such as image data used for the game and characters are stored in the storage medium 70. At Step S102, the position of the player character P to be displayed, the type and the number of NPCs to be displayed as a two-dimensional character (hereinafter, referred to as "two-dimensional NPC" or "two-dimensional non-player character"), the type and the number of NPCs to be displayed as a three-dimensional character (hereinafter, referred to as "three-dimensional NPC" or "three-dimensional non-player character"), the position of each of the NPCs to be displayed, and the like are determined in accordance with the control program. In this case, the number of three-dimensional NPCs is determined so as to be a predetermined 3D upper limit number or less (for example, 10, 15, or 20 pieces). In the present embodiment, for example, the screen as illustrated in FIG. 2 is determined as an initial screen.

Subsequently, the control section 11 determines the viewpoint position of a virtual camera, the direction of a visual axis, and the size of a visual angle in accordance with the control program, and carries out an initial setup for the virtual camera to execute perspective transformation (Step S103). Then, the processing flow proceeds to Step S108.

On the other hand, in the case where it is determined that the game is executed and it is not time to change the scene ("No" at Step S101), the control section 11 determines whether instruction data to move the player character P are input from the input section 21 by the operation of the player or not (Step S104).

In the case where it is determined that the instruction data to move the player character P are input, the control section 11 updates necessary data among data on the viewpoint position of the virtual camera, data on the direction of the visual axis, and data on the size of the visual angle in accordance with the content of the instruction data from the input section 21, and changes the setting content of the virtual camera (Step S105).

Subsequently, the control section 11 carries out a 2D character setting process (will be described later) to carry out various settings for the respective two-dimensional NPCs (Step S106), and carries out a 3D character setting process (will be described later) to carry out various setting for the respective three-dimensional NPCs (Step S107).

The control section 11 perspectively transforms the virtual three-dimensional space including the player character P and the NPCs to be displayed from the virtual camera onto the virtual screen in accordance with setting content of the virtual camera, and carries out a display process to generate a two-dimensional image to be displayed on the image display screen 51 (Step S108). When the display process is terminated, this main process is terminated. Then, when timer interruption is generated at timing of the start of a next frame period, a next main process is carried out. By repeatedly carrying out the main process, a character image is switched every frame period, and a moving image (animation) is displayed on the image display screen 51.

Now, the display process at Step S108 will be simply described. At Step S108, the control section 11 first transforms at least the coordinates of the vertexes of respective polygons included within a range to be perspectively transformed on the virtual screen among the coordinates of the vertexes of polygons constituting the virtual three-dimensional space in which the player character P and the three-dimensional NPCs are included from the coordinates of the world coordinate system to the coordinates of the viewpoint coordinate system. Further, the control section 11 generates, in accordance with processing results of the 2D character setting process, 2D display command information (for example, information including the type of two-dimensional NPC, display position on the viewpoint coordinate system, the enlarging or contracting ratio of a sprite image, rotation angle of the sprite image) required to display the two-dimensional NPC on the virtual three-dimensional space. Subsequently, the control section 11 transmits the coordinates of the vertexes of polygons of the player character P and the three-dimensional NPCs in the viewpoint coordinate system and the 2D display command information for the two-dimensional NPCs to the graphics processor 15, thereby outputting a drawing command to the graphics processor 15.

When the drawing command is input, the graphics processor 15 updates, on the basis of the coordinates of the viewpoint coordinate system, the content of the Z buffer so that data on the points which reside at the front side are retained with respect to points constituting each surface. When the content of the Z buffer is updated, the graphics processor 15 develops image data on the points which reside at the front side on the frame memory 19. Further, the graphics processor 15 carries out some processes such as a shading process and a texture mapping process with respect to the developed image data.

Then, the graphics processor 15 in turn reads out the image data developed on the frame memory 19, and generates video signals by adding a sync signal to the image data to output the video signals to the display device 50. The display device 50 displays an image corresponding to the video signals output from the graphics processor 15 on the image display screen 51. By switching images displayed on the image display screen 51 every single frame period, the player can see images including the situation in which the player character and/or the NPCs are moved on the field.

Figure 4:
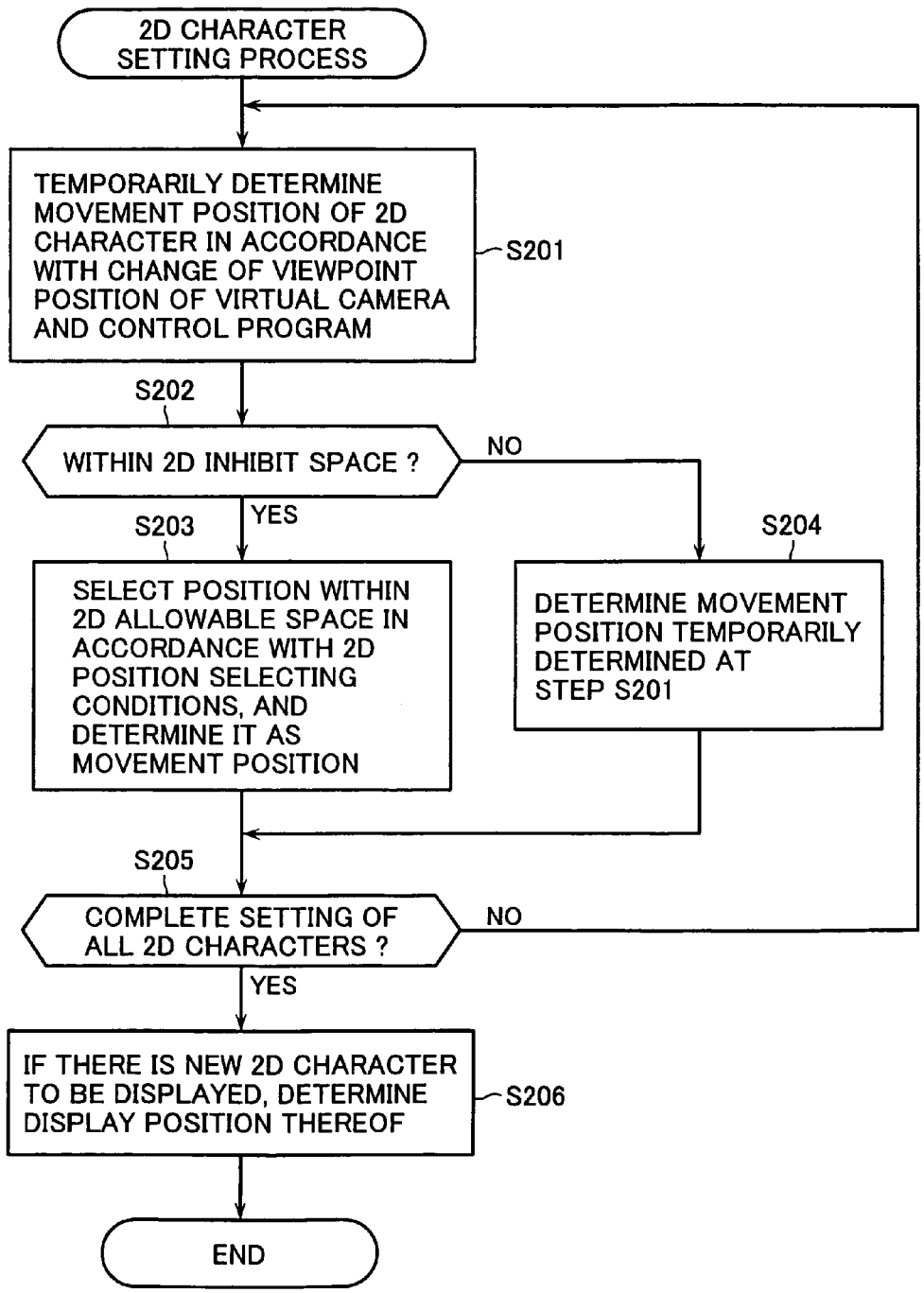
FIG. 4 is a flowchart which illustrates an example of a 2D character setting process.

FIG. 4 is a flowchart which illustrates an example of the 2D character setting process (Step S106).

In the 2D character setting process, the control section 11 temporarily determines the movement position of each of the two-dimensional NPCs displayed on the virtual three-dimensional space in accordance with change in the viewpoint position of the virtual camera (difference between the viewpoint positions before and after the change in the case of changing the setting of the virtual camera at Step S105), and movement direction and movement amount of the virtual camera determined on the basis of the control program (Step S201). Subsequently, the control section 11 determines whether the movement position thus temporarily determined is within a 2D inhibit space (will be described later) or not (Step S202).

In the case where it is determined that the movement position thus temporarily determined is within the 2D inhibit space ("Yes" at Step S202), the control section 11 selects a position within a 2D allowable space (will be described later) in accordance with predetermined 2D position selecting conditions, and determines the selected position as the movement position (Step S203).

The "2D position selecting conditions" define that the position is at least a position within the 2D allowable space and is one so that the movement distance from the previous display position is within a predetermined distance (in the present embodiment, a distance to the extent that movement of the two-dimensional NPC does not become unnatural to the eye of the player is defined in advance). More specifically, the "2D position selecting conditions" define, for example, that the position is one within the 2D allowable space and nearest from the position temporarily determined at Step S201, or one within the 2D allowable space and which is first reached when shifted in a direction to back away from a central axis virtually provided in the virtual three-dimensional space (the axis extending from the front side to the back side of the virtual three-dimensional space and passing through the center of the character image), that is, in a direction extending from the central part of the image to a visual boundary surface (will be described later), or the like. In this regard, in place of the "central axis" described above, such an axis may be one extending from the front side to the back side of the virtual three-dimensional space and passing through a predetermined point in the vicinity of the center of the character image.

In the case where it is determined that the movement position thus temporarily determined is not within the 2D inhibit space ("No" at Step S202), the control section 11 determines the position temporarily determined at Step S201 as the movement position (Step S204).

Then, the control section 11 confirms whether the movement positions with respect to all the two-dimensional NPCs are determined or not (Step S205). In the case where it is determined that any two-dimensional NPC whose movement position is not yet determined remains ("No" at Step S205), the processing flow goes back to Step S201 in order to determine the movement position of each of the remaining two-dimensional NPCs.

When the movement positions with respect to all the two-dimensional NPCs are determined ("Yes" at Step S205), the control section 11 determines the display position (appearance position) of a new two-dimensional NPC in the case where the new two-dimensional NPC is to be displayed in accordance with the control program (Step S206). Then, the 2D character setting process is terminated.

Figure 5:
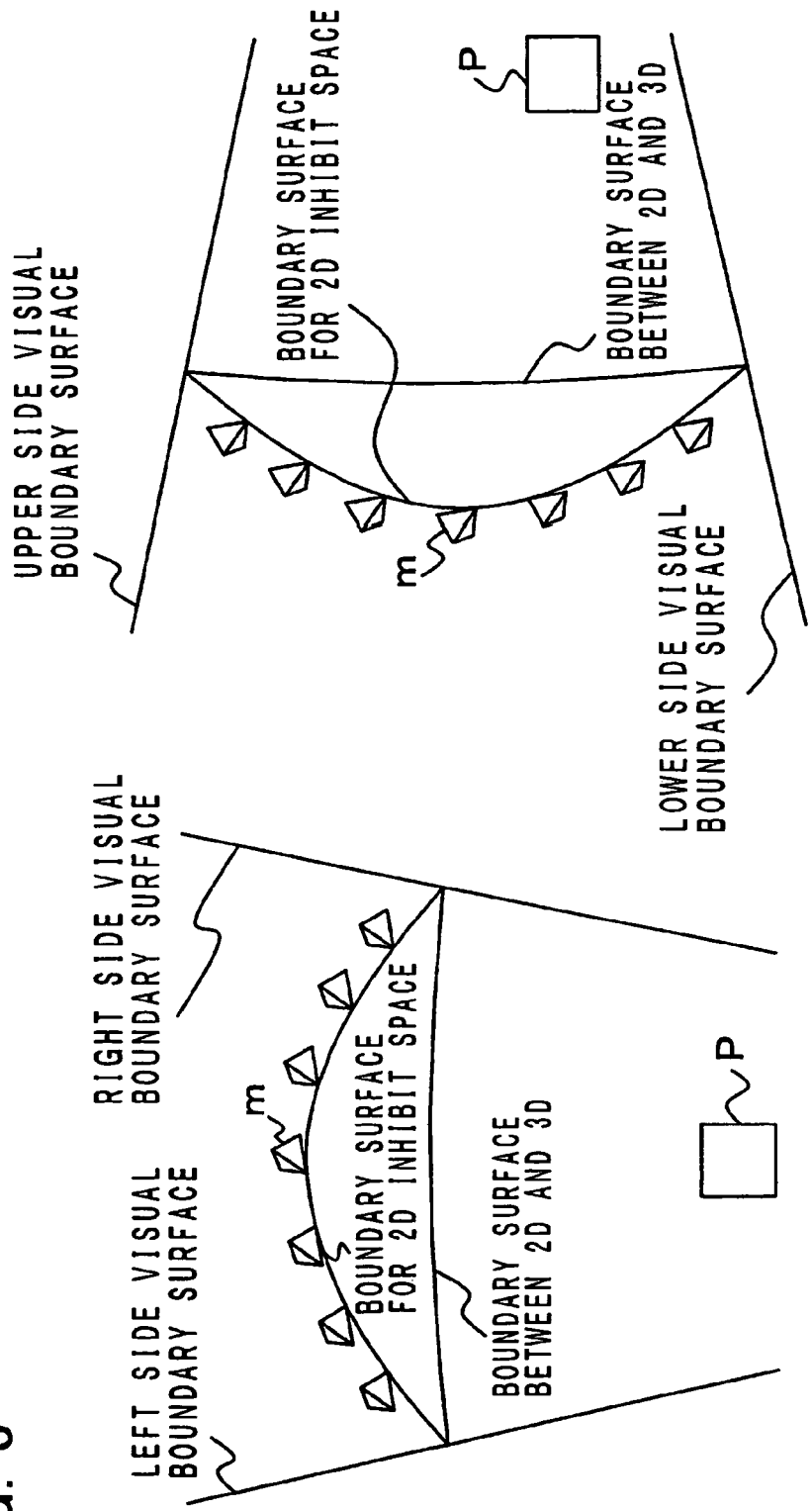
FIGS. 5A and 5B are explanatory drawings which show an example of a 2D display inhibit space in which a two-dimensional character is inhibited from being displayed.

FIG. 5 is an explanatory drawing which shows an example of the 2D inhibit space in which a two-dimensional character is inhibited from being displayed and the like. FIG. 5A is a drawing of the virtual three-dimensional space when viewed from the upper side thereof. FIG. 5B is a drawing of the virtual three-dimensional space when viewed from the left side thereof.

A left side visual boundary surface which shows a boundary for the left side of the field of view in the virtual camera, a right side visual boundary surface which shows a boundary for the right side of the field of view in the virtual camera, a boundary surface between 2D (two-dimensional character display space) and 3D (three-dimensional character display space), and a boundary surface for the 2D inhibit space are shown in FIG. 5A. On the other hand, an upper side visual boundary surface which shows a boundary for the upper side of the field of view in the virtual camera, a lower side visual boundary surface which shows a boundary for the lower side of the field of view in the virtual camera, the boundary surface between the 2D and the 3D, and the boundary surface for the 2D inhibit space are shown in FIG. 5B.

The boundary surface between the 2D and the 3D is a surface formed at the predetermined distance from the viewpoint position of the virtual camera (for example, a distance corresponding to 40 m in the real space, a distance corresponding to 50 m in the real space, a distance corresponding to 60 m in the real space, or the like), and is a boundary surface which shows an absolute boundary between the space in which a three-dimensional character is to be displayed and the space in which a two-dimensional character is to be displayed (a boundary across which a character is strictly inhibited from being moved). The three-dimensional character display space which positions at the side of a direction of the viewpoint position of the virtual camera (in a direction toward the display position of the player character P) when viewed from the boundary surface between the 2D and the 3D is a space in which a three-dimensional character can be displayed and a two-dimensional character cannot be displayed. On the other hand, the two-dimensional character display space which positions at the opposite side of the direction of the viewpoint position of the virtual camera (in a direction opposite to the display position of the player character P) when viewed from the boundary surface between the 2D and the 3D is a space in which a two-dimensional character can be displayed and a three-dimensional character cannot be displayed.

The boundary surface for the 2D inhibit space resides within the two-dimensional character display space, and in the present embodiment, it is a boundary surface which shows a boundary between a region to inhibit a two-dimensional character from being displayed and a region to allow a two-dimensional character to be displayed. An outer frame portion of the boundary surface for the 2D inhibit space substantially corresponds with an outer frame portion of the boundary surface between the 2D and the 3D. A space positioned between the boundary surface for the 2D inhibit space and the boundary surface between the 2D and the 3D is the 2D inhibit space for inhibiting a two-dimensional character from being displayed in the present embodiment. Further, a space positioned at the opposite side of the 2D inhibit space when viewed from the boundary surface for the 2D inhibit space is the 2D allowable space for allowing a two-dimensional character to be displayed in the present embodiment.

In the present embodiment, as illustrated in FIG. 5A, for example, a two-dimensional non-player character m reaches the boundary surface for the 2D inhibit space as the player character P approaches the two-dimensional non-player character m. In the case where the player character P further approaches the two-dimensional non-player character m, the two-dimensional non-player character m is moved to a direction toward the left side visual boundary surface or the right side visual boundary surface. Then, in the case where the player character P approaches the two-dimensional non-player character m furthermore, the two-dimensional non-player character m is moved to the outside of the field of view of the virtual camera from the left side visual boundary surface or the right side visual boundary surface.

Further, in the present embodiment, as illustrated in FIG. 5B, for example, a two-dimensional non-player character m reaches the boundary surface for the 2D inhibit space as the player character P approaches the two-dimensional non-player character m. In the case where the player character P further approaches the two-dimensional non-player character m, the two-dimensional non-player character m is moved to a direction toward the upper side visual boundary surface or the lower side visual boundary surface. Then, in the case where the player character P approaches the two-dimensional non-player character m furthermore, the two-dimensional non-player character m is moved to the outside of the field of view of the virtual camera from the upper side visual boundary surface or the lower side visual boundary surface.

In this regard, in the case where the virtual three-dimensional space is, for example, a cosmic space, a undersea space, or an aerial space, and the player character P is displayed so as to be floating in the air, the two-dimensional non-player character m may be moved in the direction toward the lower side visual boundary surface, and be moved to the outside of the field of view of the virtual camera from the lower side visual boundary surface. However, the player character P may stand on the ground, or may be displayed at a position near the ground even though the player character P is floating in the air, whereby the two-dimensional non-player character m cannot be moved to the outside of the field of view of the virtual camera from the lower side visual boundary surface. In such cases, the two-dimensional non-player character m may be moved to any one of the left side, right side and the upper side without being moved to the lower side even in the case where the two-dimensional non-player character m reaches the boundary surface for the 2D inhibit space as the player character P approaches the two-dimensional non-player character m.

In this regard, the 2D inhibit space may be a space for inhibiting the central portion of a two-dimensional character from moving within the space, or a space for inhibiting a part of a two-dimensional character from moving within the space.

Further, in the example illustrated in FIG. 5, although the example in which the two-dimensional non-player character m is moved to any one of the upper side, the lower side, the left side and the right side has been described in order to simplify the explanation, the two-dimensional non-player character m may be moved in an oblique direction such as an upper right direction and an upper left direction.

Figure 6:
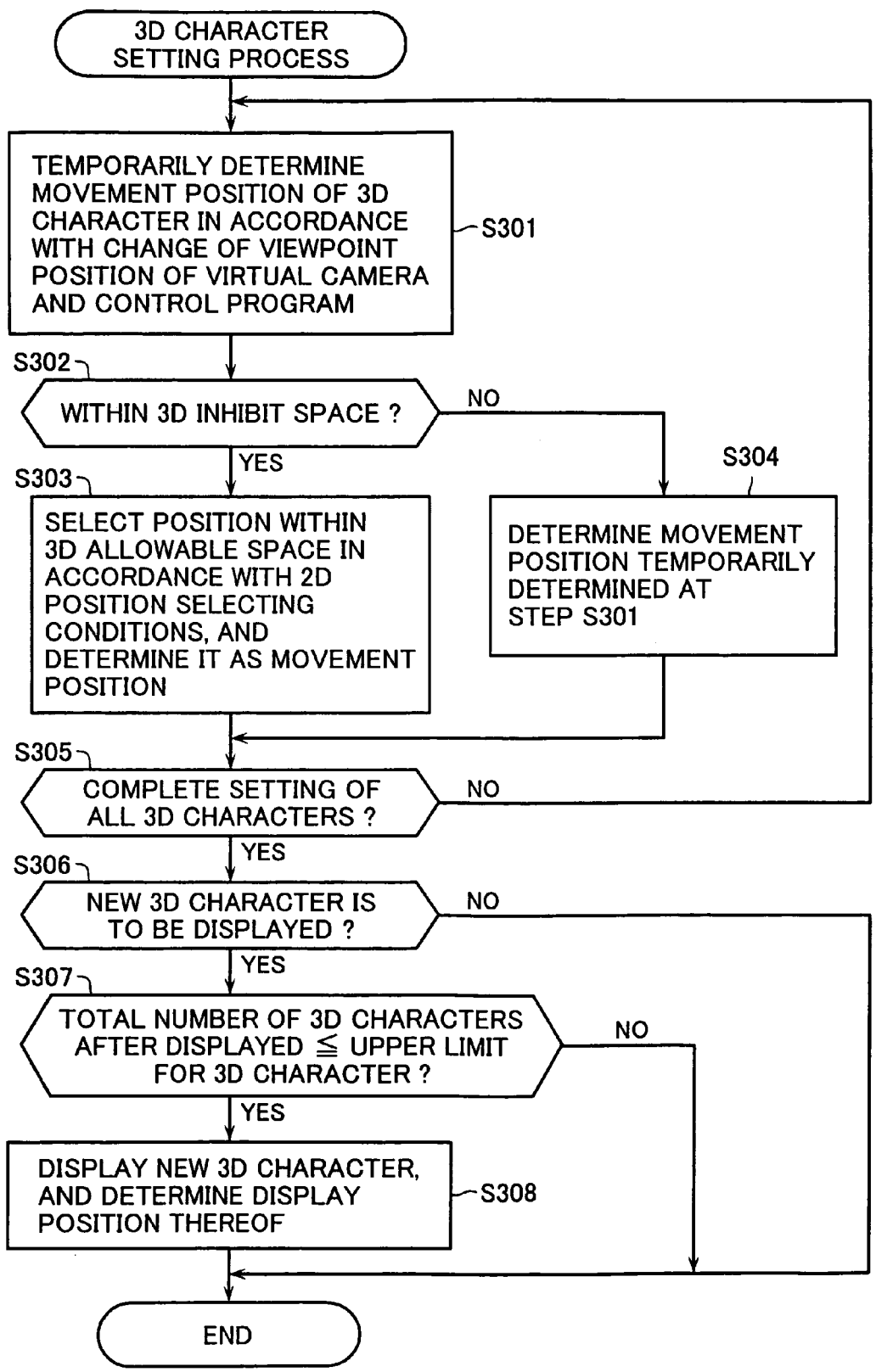
FIG. 6 is a flowchart which illustrates an example of a 3D character setting process.

FIG. 6 is a flowchart which illustrates an example of the 3D character setting process (Step S107).

In the 3D character setting process, the control section 11 temporarily determines the movement position of each of the three-dimensional NPCs displayed on the virtual three-dimensional space in accordance with change in the viewpoint position of the virtual camera (difference between the viewpoint positions before and after the change in the case of changing the setting of the virtual camera at Step S105) and movement direction and movement amount determined on the basis of the control program (Step S301). Subsequently, the control section 11 determines whether the movement position thus temporarily determined is within a 3D inhibit space (will be described later) or not (Step S302).

In the case where it is determined that the movement position thus temporarily determined is within the 3D inhibit space ("Yes" at Step S302), the control section 11 selects a position within a 3D allowable space (will be described later) in accordance with predetermined 3D position selecting conditions, and determines the selected position as the movement position (Step S303).

The "3D position selecting conditions" define that the position is at least a position within the 3D allowable space and is one so that the movement distance from the previous display position is within a predetermined distance (in the present embodiment, a distance to the extent that movement of the three-dimensional NPC does not become unnatural to the eye of the player is defined in advance). More specifically, the "3D position selecting conditions" define, for example, that the position is one within the 3D allowable space and nearest from the position temporarily determined at Step S301, or one within the 3D allowable space and which is first reached when shifted in a direction to back away from a central axis virtually provided in the virtual three-dimensional space (the axis extending from the front side to the back side of the virtual three-dimensional space and passing through the center of the character image), that is, in a direction extending from the central part of the image to a visual boundary surface (will be described later), or the like. In this regard, in place of the "central axis" described above, such an axis may be one extending from the front side to the back side of the virtual three-dimensional space and passing through a predetermined point in the vicinity of the center of the character image.

In the case where it is determined that the movement position thus temporarily determined is not within the 3D inhibit space ("No" at Step S302), the control section 11 determines the position temporarily determined at Step S301 as the movement position (Step S304).

Then, the control section 11 confirms whether the movement positions with respect to all the three-dimensional NPCs are determined or not (Step S305). In the case where it is determined that any three-dimensional NPC whose movement position is not yet determined remains ("No" at Step S305), the processing flow goes back to Step S301 in order to determine the movement position of each of the remaining three-dimensional NPCs.

When the movement positions with respect to all the three-dimensional NPCs are determined ("Yes" at Step S305), the control section 11 temporarily determines whether a new three-dimensional NPC is to be displayed in accordance with the control program or not (Step S306). In the case where it is determined that a three-dimensional NPC is to be displayed newly ("Yes" at Step S306), the control section 11 determines whether or not the total number of three-dimensional NPCs to be displayed on the image display screen 51 when the three-dimensional NPC is newly displayed becomes the 3D upper limit number or less (Step S307).

In the case where it is determined that the total number of three-dimensional NPCs is the 3D upper limit number or less ("Yes" at Step S307), the control section 11 makes the display device 50 newly display the three-dimensional NPC temporarily determined at Step S306, and determines the display position (appearance position) of the new three-dimensional NPC (Step S308).

In the case where it is determined that the total number of three-dimensional NPCs is not the 3D upper limit number or less ("No" at Step S307) or the new 3D character is not to be displayed ("No" at step S306), the control section 11 does not make the display device 50 newly display the three-dimensional NPC temporarily determined at Step S306, and the 3D character setting process is directly terminated.

Figure 7:
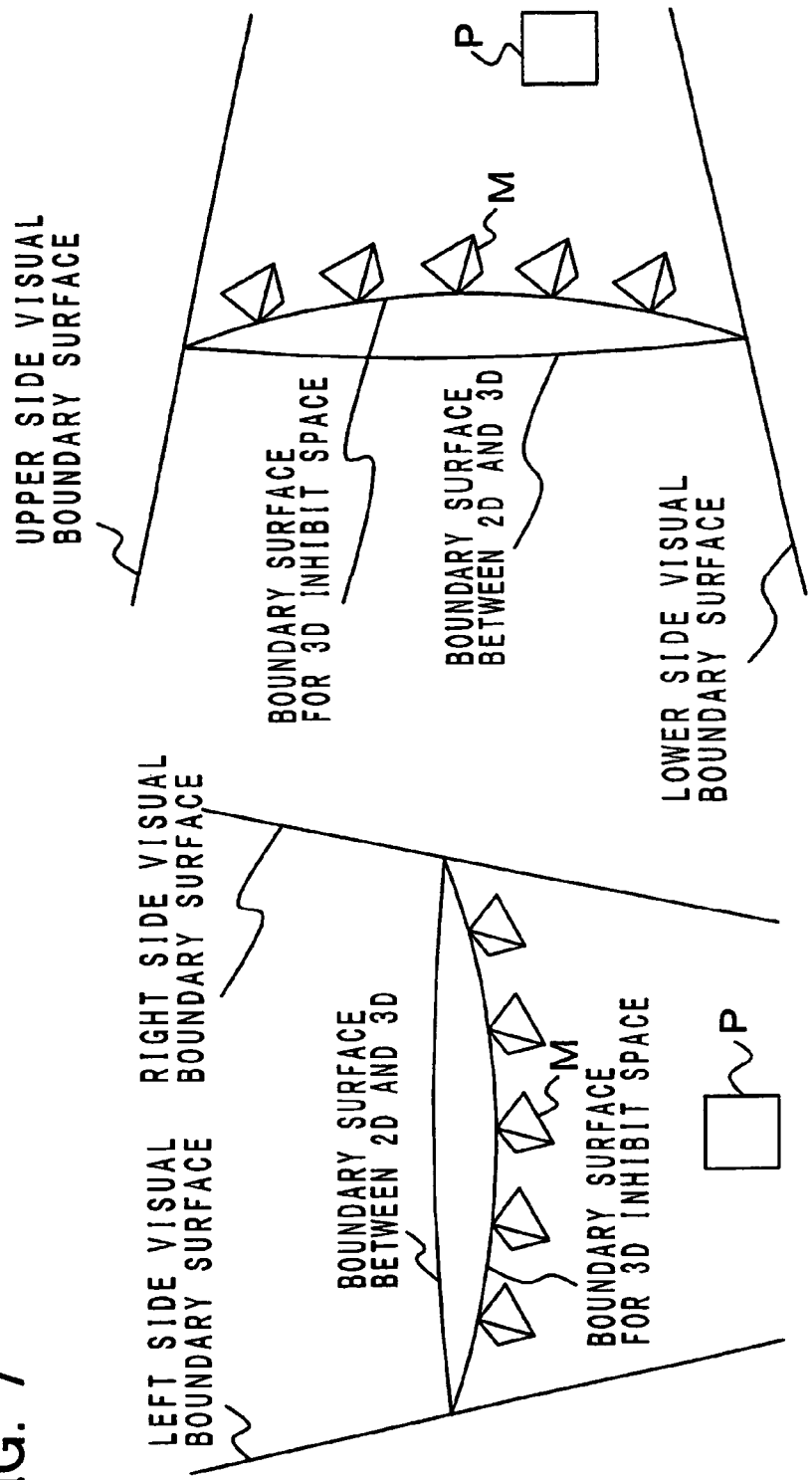
FIGS. 7A and 7B are explanatory drawings which show an example of a 3D display inhibit space in which a three-dimensional character is inhibited from being displayed.

FIG. 7 is an explanatory drawing which shows an example of the 3D inhibit space in which a three-dimensional character is inhibited from being displayed and the like. FIG. 7A is a drawing of the virtual three-dimensional space when viewed from the upper side thereof. FIG. 7B is a drawing of the virtual three-dimensional space when viewed from the left side thereof.

A left side visual boundary surface which shows a boundary for the left side of the field of view in the virtual camera, a right side visual boundary surface which shows a boundary for the right side of the field of view in the virtual camera, a boundary surface between 2D (two-dimensional character display space) and 3D (three-dimensional character display space), and a boundary surface for the 3D inhibit space are shown in FIG. 7A. On the other hand, an upper side visual boundary surface which shows a boundary for the upper side of the field of view in the virtual camera, a lower side visual boundary surface which shows a boundary for the lower side of the field of view in the virtual camera, the boundary surface between the 2D and the 3D, and the boundary surface for the 3D inhibit space are shown in FIG. 7B.

The boundary surface for the 3D inhibit space resides within the three-dimensional character display space, and in the present embodiment, it is a boundary surface which shows a boundary between a region to inhibit a three-dimensional character from being displayed and a region to allow a three-dimensional character to be displayed. An outer frame portion of the boundary surface for the 3D inhibit space substantially corresponds with an outer frame portion of the boundary surface between the 2D and the 3D. A space positioned between the boundary surface for the 3D inhibit space and the boundary surface between the 2D and the 3D is the 3D inhibit space for inhibiting a three-dimensional character from being displayed in the present embodiment. Further, a space positioned at the opposite side of the 3D inhibit space when viewed from the boundary surface for the 3D inhibit space is the 3D allowable space for allowing a three-dimensional character to be displayed in the present embodiment.

In the present embodiment, as illustrated in FIG. 7A, for example, a three-dimensional non-player character M reaches the boundary surface for the 3D inhibit space as the player character P goes away from the three-dimensional non-player character M. In the case where the player character P further goes away from the three-dimensional non-player character M, the three-dimensional non-player character M is moved to a direction toward the left side visual boundary surface or the right side visual boundary surface. In the case where the player character P then goes away from the three-dimensional non-player character M furthermore, the three-dimensional non-player character M is moved to be outside of the field of view from the left side visual boundary surface or the right side visual boundary surface.

Further, in the present embodiment, as illustrated in FIG. 7B, for example, a three-dimensional non-player character M reaches the boundary surface for the 3D inhibit space as the player character P goes away from the three-dimensional non-player character M. In the case where the player character P further goes away from the three-dimensional non-player character M, the three-dimensional non-player character M is moved to a direction toward the upper side visual boundary surface or the lower side visual boundary surface. In the case where the player character P then goes away from the three-dimensional non-player character M furthermore, the three-dimensional non-player character M is moved to the outside of the field of view from the upper side visual boundary surface or the lower side visual boundary surface.

In this regard, in the case where the virtual three-dimensional space is, for example, a cosmic space, an undersea space, or an aerial space, and the player character P is displayed so as to be floating in the air, the three-dimensional non-player character M may be moved in the direction toward the lower side visual boundary surface, and be moved to the outside of the field of view from the lower side visual boundary surface. However, the player character P may stand on the ground, or may be displayed at a position near the ground even though the player character P is floating in the air, whereby the three-dimensional non-player character M cannot be moved to the outside of the field of view from the lower side visual boundary surface. In such cases, the three-dimensional non-player character M may be moved to any one of the left side, right side and the upper side without being moved to the lower side even in the case where the three-dimensional non-player character M reaches the boundary surface for the 3D inhibit space as the player character P goes away from the three-dimensional non-player character M.

In this regard, the 3D inhibit space may be a space for inhibiting the central portion of a three-dimensional character from moving within the space, or a space for inhibiting a part of a three-dimensional character from moving within the space.

Further, in the example illustrated in FIG. 7, although the example in which the three-dimensional non-player character M is moved to any one of the upper side, the lower side, the left side and the right side has been described in order to simplify the explanation, the three-dimensional non-player character M may be moved in an oblique direction such as an upper right direction and an upper left direction.

Figure 8:
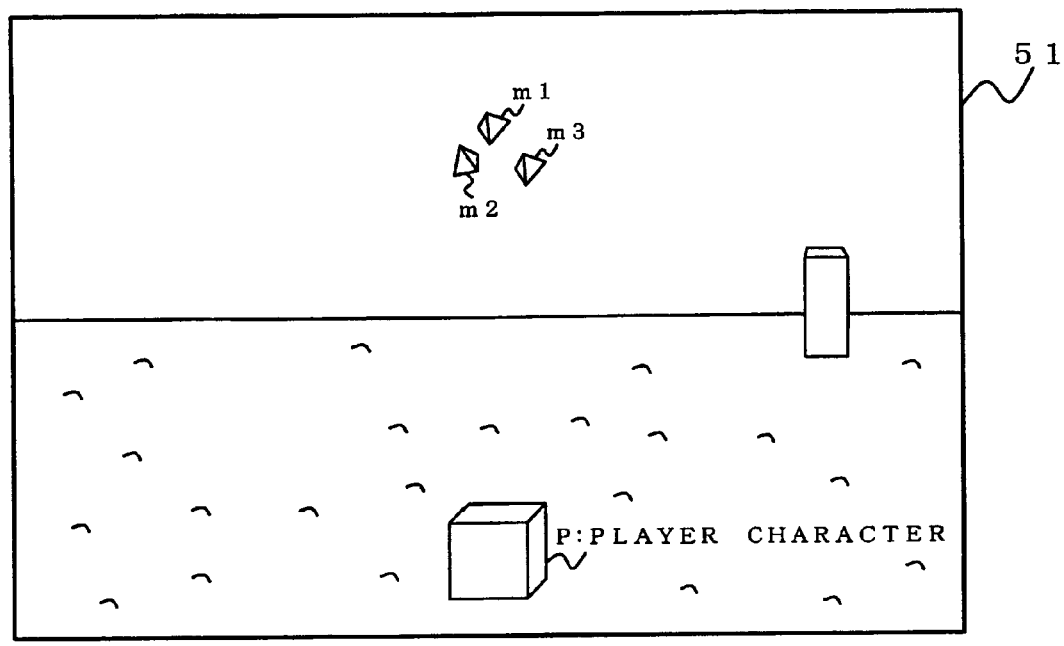
FIG. 8 is an explanatory drawing which shows an example of movement modes of two-dimensional non-player characters when a player character moves to the back side in the virtual three-dimensional space.
Figure 9:
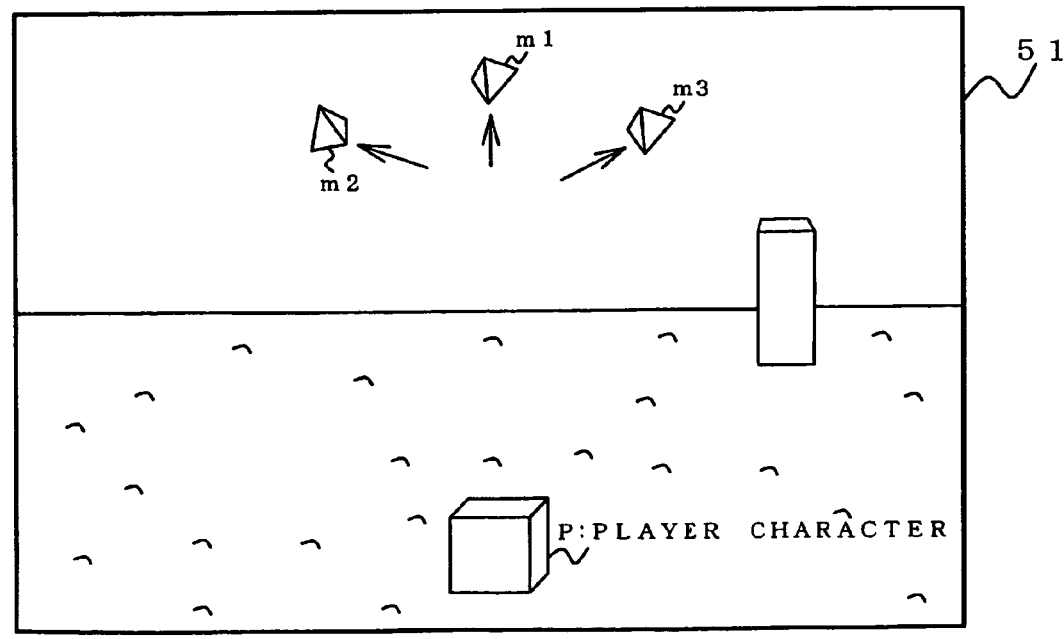
FIG. 9 is another explanatory drawing which shows an example of movement modes of two-dimensional non-player characters when the player character moves to the back side in the virtual three-dimensional space.
Figure 10:
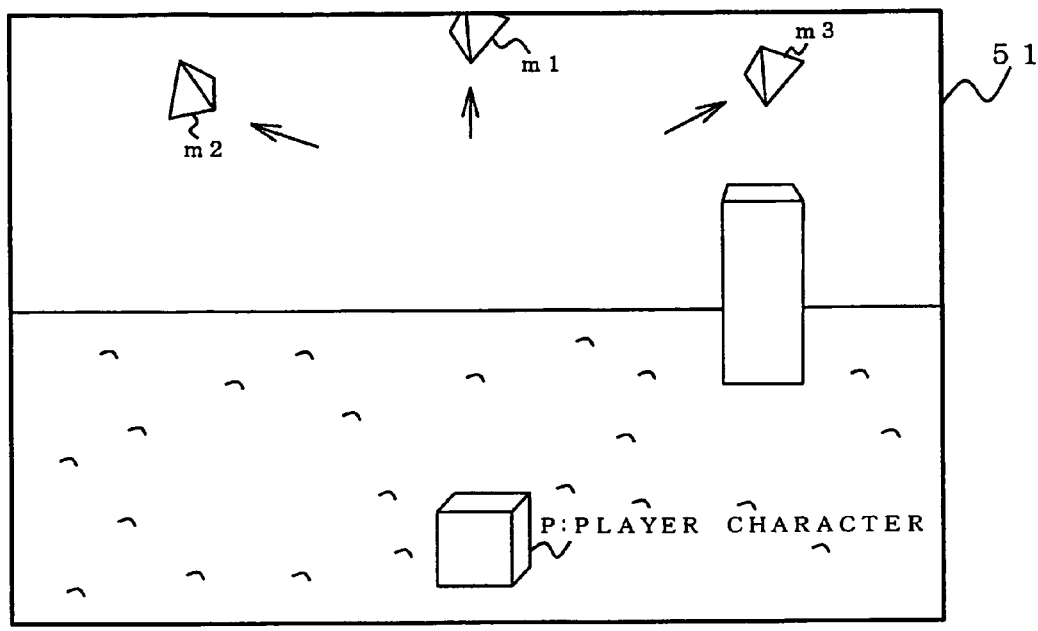
FIG. 10 is still another explanatory drawing which shows an example of movement modes of two-dimensional non-player characters when the player character moves to the back side in the virtual three-dimensional space.

Next, the state of a two-dimensional NPC displayed on the image display screen 51 by means of image display control by repeatedly carrying out the main process in the video game apparatus 100 of the present embodiment will be described concretely. FIGS. 8 to 10 are explanatory drawings which show an example of movement modes of two-dimensional non-player characters m1 to m3 when a player character P moves to the back side in the virtual three-dimensional space.

Here, in order to simplify the explanation, the case where the player character P is moved to the back side of the virtual three-dimensional space displayed on the image display screen 51 (in a direction to approach three two-dimensional non-player character m1, m2 and m3) when the three two-dimensional non-player character m1, m2 and m3 are displayed as illustrated in FIG. 8 will be described as an example.

In this case, each of the two-dimensional non-player characters m1, m2 and m3 illustrated in FIG. 8 is positioned in the vicinity of the boundary surface for the 2D inhibit space. Further, here, the "2D position selecting conditions" are set to "that the position is one within the 2D allowable space and which is first reached when shifted in a direction to back away from the central axis of the virtual three-dimensional space (in a direction toward the visual boundary surface)".

When the player character P is moved to the back side of the virtual three-dimensional space in response to operation of the input section 21 by the player in the state where the image shown in FIG. 8 is displayed, for example, as illustrated in FIG. 9, each of the two-dimensional non-player character m1, m2 and m3 is moved in a direction to approach the player character P and back away from the central axis in the virtual three-dimensional space by the processes at Steps S202 and S203 described above.

When the player character P is further moved to the back side of the virtual three-dimensional space in response to operation of the input section 21 by the player after becoming the state shown in FIG. 9, for example, as illustrated in FIG. 10, each of the two-dimensional non-player character m1, m2 and m3 is moved in a direction to further approach the player character P and further back away from the central axis in the virtual three-dimensional space by the processes at Steps S202 and S203 described above.

Then, when the player character P is further moved to the back side of the virtual three-dimensional space in response to operation of the input section 21 by the player, each of the two-dimensional non-player character m1, m2 and m3 is moved to the outside of the field of view of the virtual camera without moving within the 2D inhibit space, and is not displayed on the display image of the image display screen 51 because it goes out the end portion of the display image.

As described above, in the video game apparatus 100 of the present embodiment, when the player character P is moved in a direction at which the two-dimensional non-player characters m1, m2 and m3 are positioned in response to operation of the input section 21 by the player, the two-dimensional non-player characters m1, m2 and m3 are moved in a direction to approach the player character P and toward the visual boundary surface, and finally, they go out the field of view of the virtual camera without moving within the 2D inhibit space.

Figure 11:
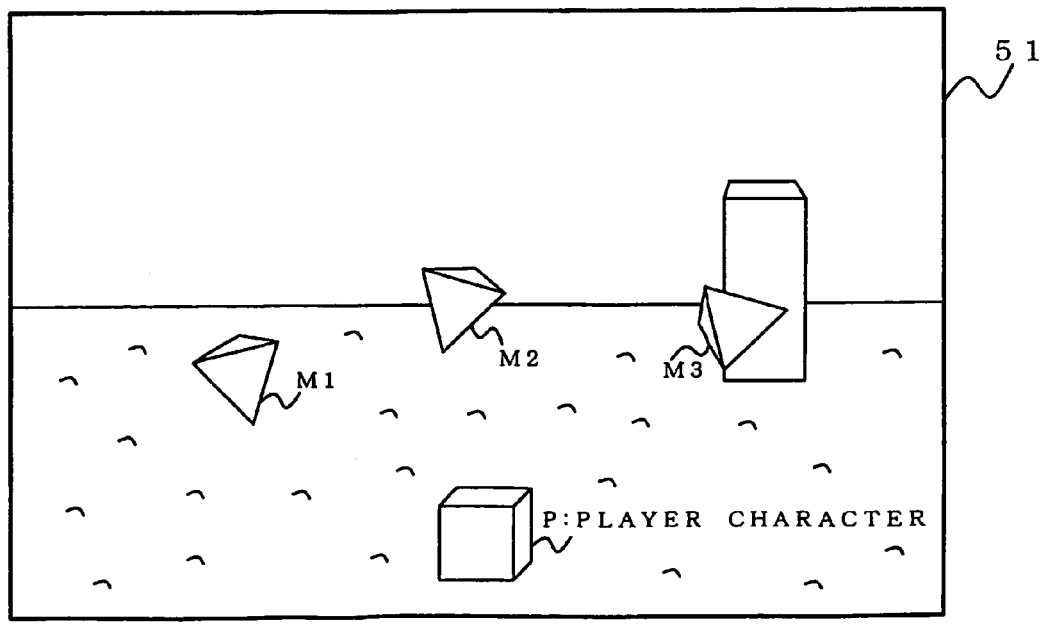
FIG. 11 is an explanatory drawing which shows an example of movement modes of three-dimensional non-player characters when the player character moves to the front side in the virtual three-dimensional space.
Figure 12:
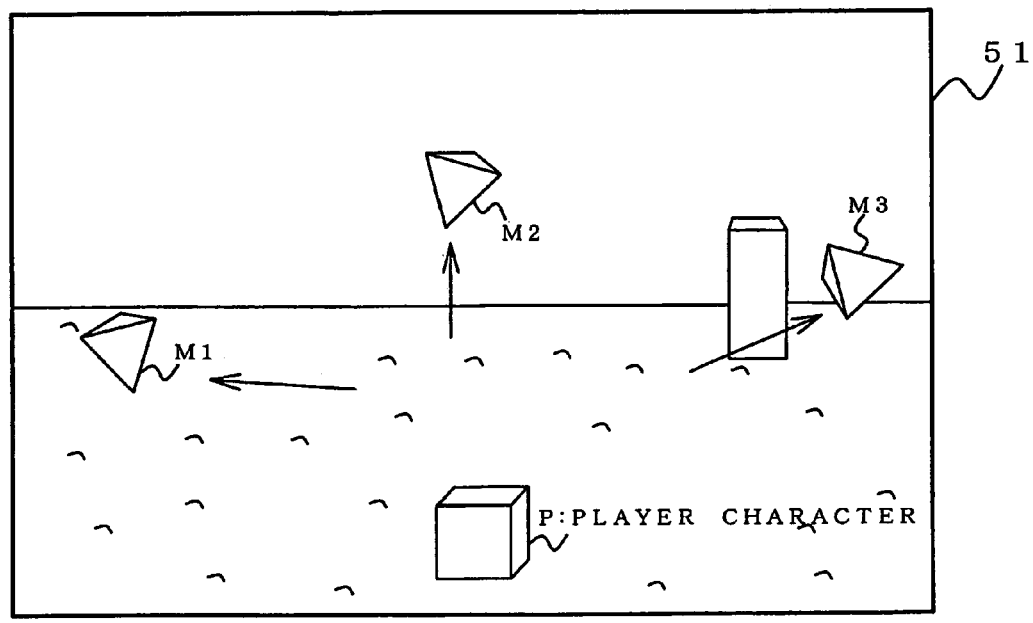
FIG. 12 is another explanatory drawing which shows an example of movement modes of three-dimensional non-player characters when the player character moves to the front side in the virtual three-dimensional space.
Figure 13:
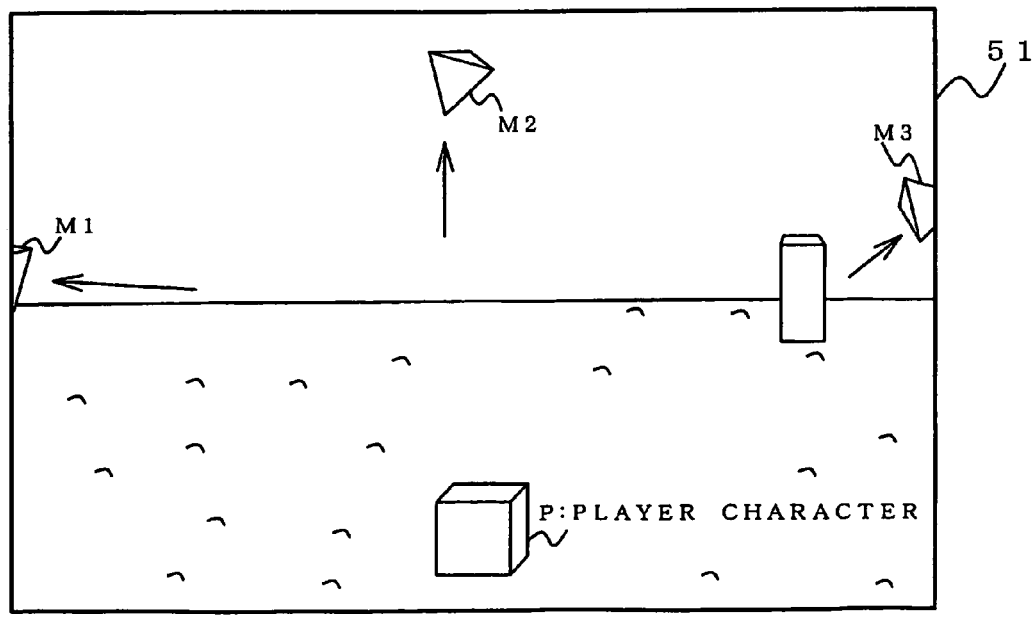
FIG. 13 is still another explanatory drawing which shows an example of movement modes of three-dimensional non-player characters when the player character moves to the front side in the virtual three-dimensional space.

Next, the state of a three-dimensional NPC displayed on the image display screen 51 by means of image display control by repeatedly carrying out the main process in the video game apparatus 100 of the present embodiment will be described specifically. FIGS. 11 to 13 are explanatory drawings which show an example of movement modes of three-dimensional non-player characters M1 to M3 when the player character P moves to the front side in the virtual three-dimensional space.

Here, in order to simplify the explanation, the case where the player character P is moved to the front side of the virtual three-dimensional space displayed on the image display screen 51 (in a direction to back away from three three-dimensional non-player character M1, M2 and M3) when the three three-dimensional non-player character M1, M2 and M3 are displayed as illustrated in FIG. 11 will be described as an example.

In this case, each of the three-dimensional non-player characters M1, M2 and M3 illustrated in FIG. 11 is positioned in the vicinity of the boundary surface for the 3D inhibit space. Further, here, the "3D position selecting conditions" is set to "that the position is one within the 3D allowable space and which is first reached when shifted in a direction to back away from the central axis of the virtual three-dimensional space (in a direction toward the visual boundary surface)".

When the player character P is moved to the front side of the virtual three-dimensional space in response to operation of the input section 21 by the player in the state where the image shown in FIG. 11 is displayed, for example, as illustrated in FIG. 12, each of the three-dimensional non-player characters M1, M2 and M3 is moved in a direction to back away from the player character P and back away from the central axis in the virtual three-dimensional space by the processes at Steps S302 and S303 described above.

When the player character P is further moved to the front side of the virtual three-dimensional space in response to operation of the input section 21 by the player after becoming the state shown in FIG. 12, for example, as illustrated in FIG. 13, each of the three-dimensional non-player characters M1, M2 and M3 is moved in a direction to back away from the player character P and further back away from the central axis in the virtual three-dimensional space by the processes at Steps S302 and S303 described above.

Then, when the player character P is further moved to the front side of the virtual three-dimensional space in response to operation of the input section 21 by the player, each of the three-dimensional non-player characters M1, M2 and M3 is moved to the outside of the field of view of the virtual camera without moving within the 3D inhibit space, and is not displayed on the display image of the image display screen 51 because it goes out the end portion of the display image.

As described above, in the video game apparatus 100 of the present embodiment, when the player character P is moved away from a direction at which the three-dimensional non-player characters M1, M2 and M3 are positioned in response to operation of the input section 21 by the player, the three-dimensional non-player characters M1, M2 and M3 are moved in a direction to back away from the player character P and toward the visual boundary surface, and finally, they go out the field of view of the virtual camera without moving within the 3D inhibit space.

As explained above, in the embodiment described above, a character once drawn by a three-dimensional character is drawn so as to maintain a position within a predetermined distance from a viewpoint position of a virtual camera (distance to the boundary surface between 2D and 3D), and a character once drawn by a two-dimensional character is drawn so as to maintain a position outside the predetermined distance from the viewpoint position of the virtual camera (distance to the boundary surface between the 2D and the 3D) in spite of the movement state of the viewpoint position of the virtual camera. Thus, it is possible to prevent the two-dimensional character and/or the three-dimensional character from passing through the boundary surface between the 2D and the 3D. This makes it possible to reduce processing load of hardware without losing realism (realistic sensation) when an image including multiple objects is drawn in a virtual three-dimensional space.

Namely, since it is possible to prevent the two-dimensional character and/or the three-dimensional character from passing through the boundary surface between the 2D and the 3D, a character once drawn by a three-dimensional character or a two-dimensional character can avoid being changed to a two-dimensional character or a three-dimensional character, respectively. Therefore, there is no need to determine whether a character already drawn is displayed by a two-dimensional character or a three-dimensional character, or to switch between a two-dimensional character and a three-dimensional character each other. For this reason, it is possible to simplify the display control for characters, and this makes it possible to reduce processing load of hardware.

Further, since it is possible to prevent the two-dimensional character and/or the three-dimensional character from passing through the boundary surface between the 2D and the 3D, a character once drawn by a two-dimensional character can avoid being displayed with a large size as it is, and this makes it possible to carry out the image display without losing realism (realistic sensation).

Moreover, in the embodiment described above, since more than the 3D upper limit number three-dimensional NPCs avoid being displayed, it is possible to set display conditions so that processing load of hardware is not increased.

Figure 14:
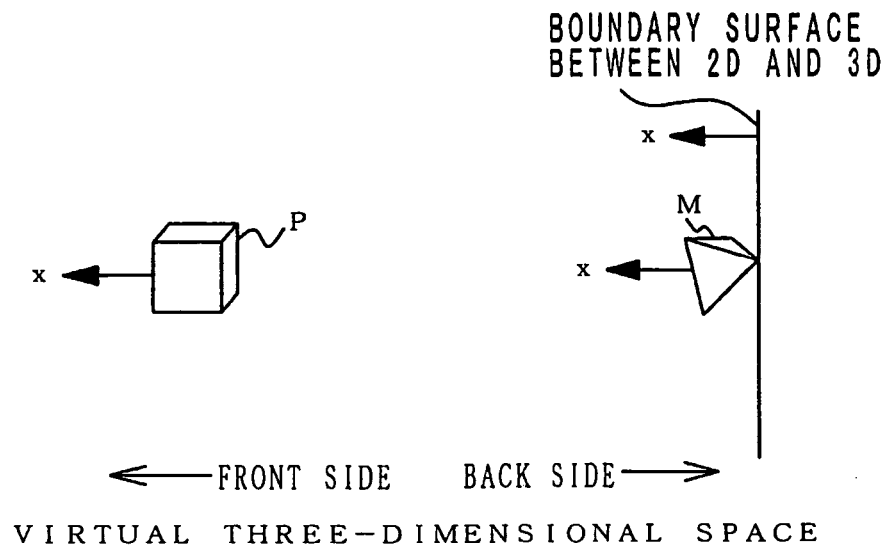
FIG. 14 is an explanatory drawing which shows an example of movement modes of three-dimensional non-player characters when the player character moves to the front side in the virtual three-dimensional space.

In this regard, in the embodiment described above, the video game apparatus 100 is controlled so as to display an image in which, when a player character P is moved to the front side of the virtual three-dimensional space, a three-dimensional NPC backs away from the player character P and is moved to a direction of a visual boundary surface, and finally goes off from the field of view of the virtual camera without moving within the 3D inhibit space. However, the video game apparatus 100 may be controlled so as to display an image in which, when the player character P is moved to the front side of the virtual three-dimensional space, the three-dimensional NPC follows the player character P in the direction of movement of the player character P so as to maintain the distance at least within a predetermined distance from the player character P (distance from the viewpoint position of the virtual camera to the boundary surface between the 2D and the 3D). In this case, there is no need to provide the 3D inhibit space described above. More specifically, for example, as illustrated in FIG. 14, in the case where the player character P is moved to the front side of the virtual three-dimensional space by a distance x when the three-dimensional non-player character M is positioned in the vicinity of the boundary surface between the 2D and the 3D, the boundary surface between the 2D and the 3D is moved to the front side of the virtual three-dimensional space by the distance x as a result of the movement of the player character P. Thus, as a result of the movement of the boundary surface between the 2D and the 3D, the three-dimensional non-player character M is moved to the front side of the virtual three-dimensional space by the distance x as well as the player character P while maintaining the space (range) between the player character P and the three-dimensional non-player character M without moving within the back side of the boundary surface between the 2D and the 3D. In the case where the video game apparatus 100 is controlled as described above, it is possible to reduce processing load of hardware without losing realism (realistic sensation) when an image including a three-dimensional character is drawn in a virtual three-dimensional space.

Figure 15:
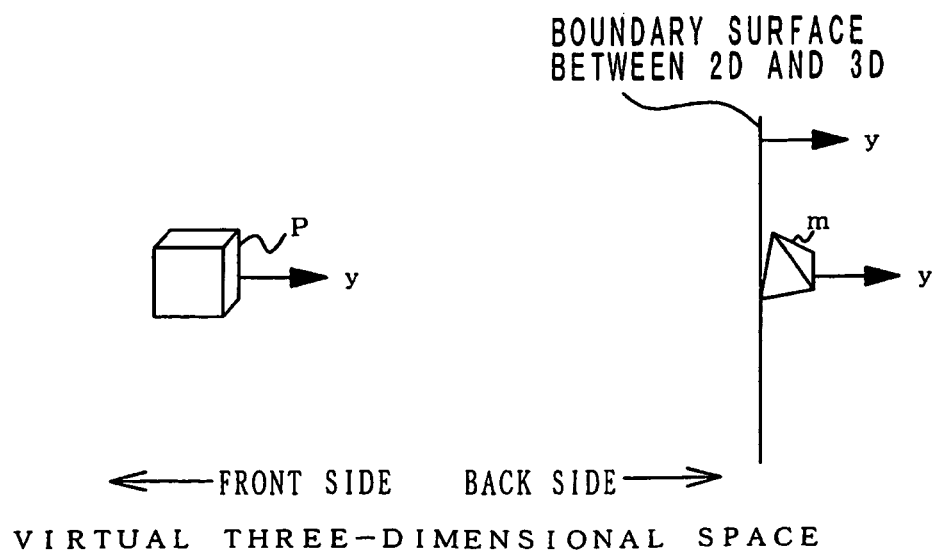
FIG. 15 is an explanatory drawing which shows another example of movement modes of two-dimensional non-player characters when the player character moves to the back side in the virtual three-dimensional space.

Further, in the embodiment described above, the video game apparatus 100 is controlled so as to display an image in which, when a player character P is moved to the back side of the virtual three-dimensional space, a two-dimensional NPC approaches the player character P and is moved to a direction of the visual boundary surface, and finally leaves the field of view of the virtual camera without moving within the 2D inhibit space. However, the video game apparatus 100 may be controlled so as to display an image in which, when the player character P is moved to the back side of the virtual three-dimensional space, the two-dimensional NPC is moved in the direction to go away from the player character P so as to maintain the distance at least outside a predetermined distance from the player character (distance from the viewpoint position of the virtual camera to the boundary surface between the 2D and the 3D). In this case, there is no need to provide the 2D inhibit space described above. More specifically, for example, as illustrated in FIG. 15, in the case where the player character P is moved to the back side (rear side) of the virtual three-dimensional space by a distance y when the two-dimensional non-player character m is positioned in the vicinity of the boundary surface between the 2D and the 3D, the boundary surface between the 2D and the 3D is moved to the back side of the virtual three-dimensional space by the distance y as a result of the movement of the player character P. Thus, as a result of the movement of the boundary surface between the 2D and the 3D, the two-dimensional non-player character m is moved to the back side of the virtual three-dimensional space by the distance y as well as the player character P while maintaining the space (range) between the player character P and the two-dimensional non-player character m without moving within the front side of the boundary surface between the 2D and the 3D. In the case where the video game apparatus 100 is controlled as described above, it is possible to reduce processing load of hardware without losing realism (realistic sensation) when an image including a two-dimensional character is drawn in a virtual three-dimensional space.

Moreover, although the video game apparatus main body 10 and the display device 50 are constructed from separate components in the embodiment described above, the display device 50 may be incorporated in the video game apparatus main body 10.

Furthermore, although it has been explained with the video game apparatus 100 as an example in the embodiment described above, the present invention is not limited thereto. The present invention can be applied to various apparatuses such as a personal computer, a cellular phone terminal, a portable game apparatus and the like as long as such an apparatus has an image generating function. In this regard, in the case where the present invention is applied to a portable game apparatus or the like, a small-sized storage medium such as a semiconductor memory card may be used as the storage medium 70 described above in place of a CD-ROM or DVD-ROM.

Further, in the embodiment described above, although it has been described that game data for making the video game apparatus main body 10 (video game apparatus 100) to carry out various processes described above (that is, various data such as control program data used for the game) are stored in the storage medium 70, the game data may be delivered by a server apparatus such as a WWW server. In this case, the video game apparatus main body 10 may obtain the game data delivered by the server apparatus via the communication network 80, and store the game data in the HDD 13. The game data may be used by being loaded on the RAM 12 from the HDD 13. In this regard, although the game data are explained in the above example, such data may include at least control program data for making a computer to carry out the image generating process in the embodiment as described above.

The present invention can be applied to a video game machine, a personal computer, a cellular phone terminal, a portable game apparatus and the like which generate a character image in which multiple characters including a three-dimensional character drawn by three-dimensional polygon data and a two-dimensional character drawn by two-dimensional sprite data are drawn in a virtual three-dimensional space. Therefore, the present invention is useful.

What is claimed is:

1. A computer-implemented method of generating a character image in which a plurality of characters are drawn in a virtual three-dimensional space, the plurality of characters including a three-dimensional character drawn by three-dimensional polygon data and a two-dimensional character drawn by two-dimensional sprite data, the computer-implemented method comprising:

drawing, with a computer, the three-dimensional character in a field of view of a virtual camera and within a predetermined distance from a viewpoint position of the virtual camera, and drawing the two-dimensional character in the field of view of the virtual camera and at a distance greater than the predetermined distance from the viewpoint position of the virtual camera;

drawing, with the computer, the three-dimensional character so as to move to a position which is within the predetermined distance from the viewpoint position of the virtual camera when the position of the three-dimensional character drawn in the field of view of the virtual camera is to be moved when the viewpoint position of the virtual camera is moved; and drawing, with the computer, the two-dimensional character so as to move to a position which is located at a distance greater than the predetermined distance from the viewpoint position of the virtual camera when the position of the two-dimensional character drawn in the field of view of the virtual camera is to be moved when the viewpoint position of the virtual camera is moved, wherein drawing the two-dimensional character comprises:

determining whether or not the two-dimensional character moves within a predetermined distance from the virtual camera when the position of the two-dimensional character is to be moved; and changing the position of the two-dimensional character to be moved to a position at a distance greater than the predetermined distance from the virtual camera when it is determined that the two-dimensional character would move within the predetermined distance from the virtual camera as a result of the movement of the two-dimensional character.

2. The method according to claim 1, wherein in the virtual three-dimensional space, a two-dimensional character display inhibit space for inhibiting the two-dimensional character from being displayed is provided in a part located outside of the predetermined distance from the viewpoint position of the virtual camera in advance, and wherein the drawing of the two-dimensional character comprises:

determining whether or not the two-dimensional character moves within the two-dimensional character display inhibit space, when the position of the two-dimensional character is to be moved; and changing the position of the two-dimensional character to be moved to a position outside the two-dimensional character display inhibit space in accordance with predefined conditions for movement of the two-dimensional character when it is determined that the two-dimensional character would move within the two-dimensional character display inhibit space as a result of moving the two-dimensional character.

3. The method according to claim 2, wherein the field of view of the virtual camera is defined by a visual boundary, wherein the two-dimensional character display inhibit space is a space adjacent to a boundary surface formed at the predetermined distance from the viewpoint position of the virtual camera, and the two-dimensional character display inhibit space is configured so that the two-dimensional character is allowed to be displayed at a position near the boundary surface when the two-dimensional character is to be displayed at a position near the visual boundary and the two-dimensional character is inhibited from being displayed at a position near the boundary surface when the two-dimensional character is to be displayed at a position spaced from the visual boundary, and wherein the predefined conditions for movement of the two-dimensional character are satisfied when the two-dimensional character is at a position spaced from a central axis of the virtual three-dimensional space so as to approach the visual boundary and outside the two-dimensional character display inhibit space.

4. The method according to claim 1, wherein in the virtual three-dimensional space, a three-dimensional character display inhibit space for inhibiting the three-dimensional character from being displayed is provided at a position located at a distance less than the predetermined distance from the viewpoint position of the virtual camera in advance, and wherein the drawing the three-dimensional character comprises:

determining whether or not the three-dimensional character moves within the three-dimensional character display inhibit space, when the position of the three-dimensional character is to be moved; and changing the position of the three-dimensional character to be moved to a position outside of the three-dimensional character display inhibit space in accordance with predefined conditions for movement of the three-dimensional character when it is determined that the three-dimensional character would move within the three-dimensional character display inhibit space as a result of moving the three-dimensional character.

5. The method according to claim 4, wherein the field of view of the virtual camera is defined by a visual boundary, wherein the three-dimensional character display inhibit space is a space adjacent to a boundary surface formed at the predetermined distance from the viewpoint position of the virtual camera, and the three-dimensional character display inhibit space is configured so that the three-dimensional character is allowed to be displayed at a position near the boundary surface when the three-dimensional character is to be displayed at a position near the visual boundary and the three-dimensional character is inhibited from being displayed at a position near the boundary surface when the three-dimensional character is to be displayed at a position spaced from the visual boundary, and wherein the predefined conditions for movement of the three-dimensional character are satisfied when the three-dimensional character is at a position spaced from a central axis of the virtual three-dimensional space so as to approach the visual boundary and also outside the three-dimensional character display inhibit space.

6. The method according to claim 1, wherein the drawing of the three-dimensional character comprises:

determining whether or not the three-dimensional character moves outside a predetermined distance from the virtual camera when the position of the three-dimensional character is to be moved; and changing the position of the three-dimensional character to be moved to a position at a distance less than the predetermined distance from the virtual camera when it is determined that the three-dimensional character would move outside the predetermined distance from the virtual camera as a result of the movement of the three-dimensional character.

7. The method according to claim 1, wherein the drawing of the character image comprises:

when the total number of three-dimensional characters drawn in the virtual three-dimensional space becomes a predetermined number or less, drawing a new three-dimensional character in the virtual three-dimensional space.

8. An image generating apparatus for generating a character image in which a plurality of characters are drawn in a virtual three-dimensional space, the plurality of characters including a three-dimensional character drawn by three-dimensional polygon data and a two-dimensional character drawn by two-dimensional sprite data, the image generating apparatus comprising:

a character drawing system which draws the three-dimensional character in a field of view of a virtual camera and within a predetermined distance from a viewpoint position of the virtual camera, and draws the two-dimensional character in the field of view of the virtual camera and at a distance greater than the predetermined distance from the viewpoint position of the virtual camera;

a three-dimensional character movement drawing system which draws the three-dimensional character so as to move to a position which is within the predetermined distance from the viewpoint position of the virtual camera when the position of the three-dimensional character drawn in the field of view of the virtual camera is to be moved when the viewpoint position of the virtual camera is moved; and a two-dimensional character movement drawing system which draws the two-dimensional character so as to move to a position which is outside the predetermined distance from the viewpoint position of the virtual camera when the position of the two-dimensional character drawn in the field of view of the virtual camera is to be moved when the viewpoint position of the virtual camera is moved, wherein the two-dimensional character movement drawing system comprises:

a two-dimensional character movement inhibit determiner which determines whether or not the two-dimensional character moves within a predetermined distance from the virtual camera when the position of the two-dimensional character is to be moved; and a two-dimensional character movement changer which changes the position of the two-dimensional character to be moved to the outside of the predetermined distance from the virtual camera when it is determined that the two-dimensional character would move within the predetermined distance from the virtual camera as a result of the movement of the two-dimensional character.

9. The image generating apparatus according to claim 8, wherein in the virtual three-dimensional space, a two-dimensional character display inhibit space for inhibiting the two-dimensional character from being displayed is provided in a part located outside of the predetermined distance from the viewpoint position of the virtual camera in advance, and wherein the two-dimensional character movement drawing system comprises:

a two-dimensional character movement inhibit determiner which determines whether or not the two-dimensional character moves within the two-dimensional character display inhibit space when the position of the two-dimensional character is to be moved; and a two-dimensional character movement changer which changes the position of the two-dimensional character to be moved to a position outside the two-dimensional character display inhibit space in accordance with predefined conditions for movement of the two-dimensional character when it is determined that the two-dimensional character would move within the two-dimensional character display inhibit space as a result of the movement of the two-dimensional character.

10. The image generating apparatus according to claim 9, wherein the field of view of the virtual camera is defined by a visual boundary,
   wherein the two-dimensional character display inhibit space is a space adjacent to a boundary surface formed at the predetermined distance from the viewpoint position of the virtual camera, and the two-dimensional character display inhibit space is configured so that the two-dimensional character is allowed to be displayed at a position near the boundary surface when the two-dimensional character is to be displayed at a position near the visual boundary and the two-dimensional character is inhibited from being displayed at a position near the boundary surface when the two-dimensional character is to be displayed at a position spaced from the visual boundary, and
   wherein the predefined conditions for movement of the two-dimensional character are satisfied when the two-dimensional character is at a position spaced from a central axis of the virtual three-dimensional space so as to approach the visual boundary and outside the two-dimensional character display inhibit space.

11. The image generating apparatus according to claim 8, wherein in the virtual three-dimensional space, a three-dimensional character display inhibit space for inhibiting the three-dimensional character from being displayed is provided at a position located at a distance less than the predetermined distance from the viewpoint position of the virtual camera in advance, and
   wherein the three-dimensional character movement drawing system comprises:
      a three-dimensional character movement inhibit determiner which determines whether or not the three-dimensional character moves within the three-dimensional character display inhibit space when the position of the three-dimensional character is to be moved; and
      a three-dimensional character movement changer which changes the position of the three-dimensional character to be moved to a position outside the three-dimensional character display inhibit space in accordance with predefined conditions for movement of the three-dimensional character when it is determined that the three-dimensional character would move within the three-dimensional character display inhibit space as a result of the movement of the three-dimensional character.

12. The image generating apparatus according to claim 11, wherein the field of view of the virtual camera is defined by a visual boundary, and
   wherein the three-dimensional character display inhibit space is a space adjacent to a boundary surface formed at the predetermined distance from the viewpoint position of the virtual camera, and the three-dimensional character display inhibit space is configured so that the three-dimensional character is allowed to be displayed at a position near the boundary surface when the three-dimensional character is to be displayed at a position near the visual boundary and the three-dimensional character is inhibited from being displayed at a position near the boundary surface when the three-dimensional character is to be displayed at a position spaced from the visual boundary, and
   wherein the predefined conditions for movement of the three-dimensional character are satisfied when the three-dimensional character is at a position spaced from a central axis of the virtual three-dimensional space so as to approach the visual boundary outside the three-dimensional character display inhibit space.

13. The image generating apparatus according to claim 8, wherein the three-dimensional character movement drawing system further comprises:
   a three-dimensional character movement inhibit determiner which determines whether or not the three-dimensional character moves outside a predetermined distance from the virtual camera, when the position of the three-dimensional character is to be moved; and
   a three-dimensional character movement changer which changes the position of the three-dimensional character to be moved to a position at a distance less than the predetermined distance from the virtual camera when it is determined that the three-dimensional character would move outside the predetermined distance from the virtual camera as a result of the movement of the three-dimensional character.

14. The image generating apparatus according to claim 8, wherein the character drawing system draws a new three-dimensional character image in the virtual three-dimensional space, when the total number of three-dimensional characters drawn in the virtual three-dimensional space becomes a predetermined number or less.

15. A computer readable medium that stores program for generating a character image in which a plurality of characters are drawn in a virtual three-dimensional space, the plurality of characters including a three-dimensional character drawn by three-dimensional polygon data and a two-dimensional character drawn by two-dimensional sprite data, the computer readable medium causing a computer to execute:
   drawing the three-dimensional character in a field of view of a virtual camera and within a predetermined distance from a viewpoint position of the virtual camera, and drawing the two-dimensional character in the field of view of the virtual camera and at a distance greater than the predetermined distance from the viewpoint position of the virtual camera;
   drawing the three-dimensional character so as to move to a position which is within the predetermined distance from the viewpoint position of the virtual camera when the position of the three-dimensional character drawn in the field of view of the virtual camera is to be moved when the viewpoint position of the virtual camera is moved; and
   drawing the two-dimensional character so as to move to a position which is located at a distance greater than the predetermined distance from the viewpoint position of the virtual camera when the position of the two-dimensional character drawn in the field of view of the virtual camera is to be moved when the viewpoint position of the virtual camera is moved,
   wherein, when causing the computer to execute drawing the two-dimensional character, the computer readable medium causes the computer to execute:
      determining whether or not the two-dimensional character moves within a predetermined distance from the virtual camera when the position of the two-dimensional character is to be moved; and
      changing the position of the two-dimensional character to be moved to a position at a distance greater than the predetermined distance from the virtual camera when it is determined that the two-dimensional character would move within the predetermined distance from the virtual camera as a result of the movement of the two-dimensional character.

16. The computer readable medium according to claim 15, wherein in the virtual three-dimensional space, a two-dimensional character display inhibit space for inhibiting the two-dimensional character from being displayed is provided in a part located outside of the predetermined distance from the viewpoint position of the virtual camera in advance, and wherein the computer readable medium further causes the computer to execute:

determining whether or not the two-dimensional character moves within the two-dimensional character display inhibit space when the position of the two-dimensional character is to be moved; and changing the position of the two-dimensional character to be moved to a position outside the two-dimensional character display inhibit space in accordance with predefined conditions for movement of the two-dimensional character when it is determined that the two-dimensional character would move within the two-dimensional character display inhibit space as a result of the movement of the two-dimensional character.

17. The computer readable medium according to claim 16, wherein the field of view of the virtual camera is defined by a visual boundary, wherein the two-dimensional character display inhibit space is a space adjacent to a boundary surface formed at the predetermined distance from the viewpoint position of the virtual camera, and the two-dimensional character display inhibit space is configured so that the two-dimensional character is allowed to be displayed at a position near the boundary surface when the two-dimensional character is to be displayed at a position near the visual boundary and the two-dimensional character is inhibited from being displayed at a position near the boundary surface when the two-dimensional character is to be displayed at a position spaced from the visual boundary, and wherein the predefined conditions for movement of the two-dimensional character are satisfied when the two-dimensional character is at a position spaced from a central axis of the virtual three-dimensional space so as to approach the visual boundary outside the two-dimensional character display inhibit space.

18. The computer readable medium according to claim 15, wherein in the virtual three-dimensional space, a three-dimensional character display inhibit space for inhibiting the three-dimensional character from being displayed is provided at a position located at a distance less than the predetermined distance from the viewpoint position of the virtual camera in advance, and wherein the computer readable medium further causes the computer to execute:

determining whether or not the three-dimensional character moves within the three-dimensional character display inhibit space when the position of the three-dimensional character is to be moved; and changing the position of the three-dimensional character to be moved to a position outside the three-dimensional character display inhibit space in accordance with predefined conditions for movement of the three-dimensional character when it is determined that the three-dimensional character would move within the three-dimensional character display inhibit space as a result of the movement of the three-dimensional character.

19. The computer readable medium according to claim 18, wherein the field of view of the virtual camera is defined by a visual boundary, wherein the three-dimensional character display inhibit space is a space adjacent to a boundary surface formed at the predetermined distance from the viewpoint position of the virtual camera, and the three-dimensional character display inhibit space is configured so that the three-dimensional character is allowed to be displayed at a position near the boundary surface when the three-dimensional character is to be displayed at a position near the visual boundary and the three-dimensional character is inhibited from being displayed at a position near the boundary surface when the three-dimensional character is to be displayed at a position spaced from the visual boundary, and wherein the predefined conditions for movement of the three-dimensional character are satisfied when the three-dimensional character is at a position spaced from a central axis of the virtual three-dimensional space so as to approach the visual boundary outside the three-dimensional character display inhibit space.

20. The computer readable medium according to claim 15, wherein the computer readable medium further causes the computer to execute:

determining whether or not the three-dimensional character moves outside a predetermined distance from the virtual camera when the position of the three-dimensional character is to be moved; and changing the position of the three-dimensional character to be moved to a position at a distance less than the predetermined distance from the virtual camera when it is determined that the three-dimensional character would move outside the predetermined distance from the virtual camera as a result of the movement of the three-dimensional character.

21. The computer readable medium according to claim 15, wherein the computer readable medium further causes the computer to execute:

drawing a new three-dimensional character in the virtual three-dimensional space when the total number of three-dimensional characters drawn in the virtual three-dimensional space becomes a predetermined number or less.

* * * * *